US012656745B2

(12) United States Patent (10) Patent No.: US 12,656,745 B2
Tsutsui et al. (45) Date of Patent: Jun. 16, 2026

(54) SUBSTRATE PROCESSING APPARATUS, DATA PROCESSING METHOD, AND DATA PROCESSING PROGRAM

(71) Applicant: Tokyo Electron Limited, Tokyo (JP)

(72) Inventors: Takuro Tsutsui, Hokkaido (JP); Yuki Kataoka, Hokkaido (JP); Yukiya Saitou, Hokkaido (JP); Yuanchieh Ling, Hokkaido (JP)

(73) Assignee: Tokyo Electron Limited, Tokyo (JP)

( * ) Notice: Subject to any disclaimer, the term of this patent is extended or adjusted under 35 U.S.C. 154(b) by 389 days.

(21) Appl. No.: 18/567,534

(22) PCT Filed: Mar. 23, 2022

(86) PCT No.: PCT/JP2022/013601
§ 371 (c)(1),
(2) Date: Dec. 6, 2023

(87) PCT Pub. No.: WO2022/264599
PCT Pub. Date: Dec. 22, 2022

(65) Prior Publication Data
US 2024/0272592 A1 Aug. 15, 2024

(30) Foreign Application Priority Data
Jun. 17, 2021 (JP) ................................. 2021-101004

(51) Int. Cl.
*G05B 13/02* (2006.01)
(52) U.S. Cl.
CPC ................................. *G05B 13/0265* (2013.01)
(58) Field of Classification Search
CPC ................................................. G05B 13/0265
See application file for complete search history.

(56) References Cited

U.S. PATENT DOCUMENTS

2008/0040061 A1* 2/2008 Osada ............... H01J 37/32935
702/82
2013/0304419 A1* 11/2013 Nakamura .......... H10P 72/0616
702/183

(Continued)

FOREIGN PATENT DOCUMENTS

JP 2005136326 A * 5/2005
JP 2018-077779 5/2018

(Continued)

OTHER PUBLICATIONS

David Sussillo, L.F.Abbott, "Generating Coherent Patterns of Activity from Chaotic Neural Networks", Neuron. Author manuscript; available in PMC Aug. 27, 2010.

*Primary Examiner* — Suresh Suryawanshi
(74) *Attorney, Agent, or Firm* — IPUSA, PLLC

(57) ABSTRACT

A workload required for learning work is reduced. A substrate processing apparatus includes a reservoir feature generating unit configured to receive acquired first time-series sensor data and output a reservoir feature; a learning unit configured to learn, in a learning period, a weight parameter so that prediction result data obtained by performing calculations on the reservoir feature under the weight parameter correlates with acquired second time-series sensor data; a predicting unit configured to perform calculations, in a prediction period, on the reservoir feature output from the reservoir feature generating unit in response to the acquired first time-series sensor data being input, under the learned weight parameter, to output prediction result data; and a determining unit configured to determine, in the prediction period, a state of the substrate manufacturing process by comparing the prediction result data with acquired second time-series sensor data.

15 Claims, 15 Drawing Sheets

(56)            References Cited

U.S. PATENT DOCUMENTS

| | | | |
|---|---|---|---|
| 2020/0116480 A1* | 4/2020 | Shima ................. | H10P 72/0412 |
| 2020/0192324 A1* | 6/2020 | Asai ..................... | G05B 19/406 |
| 2022/0251705 A1* | 8/2022 | Hikawa ............. | H01J 37/32926 |

FOREIGN PATENT DOCUMENTS

| | | | | |
|---|---|---|---|---|
| JP | 2020-071755 | | 5/2020 | |
| KR | 20220156237 A | * | 11/2022 | ............. G06N 3/045 |
| WO | 2020/111258 | | 6/2020 | |
| WO | WO-2021066194 A1 | * | 4/2021 | ............. G06N 3/045 |

\* cited by examiner

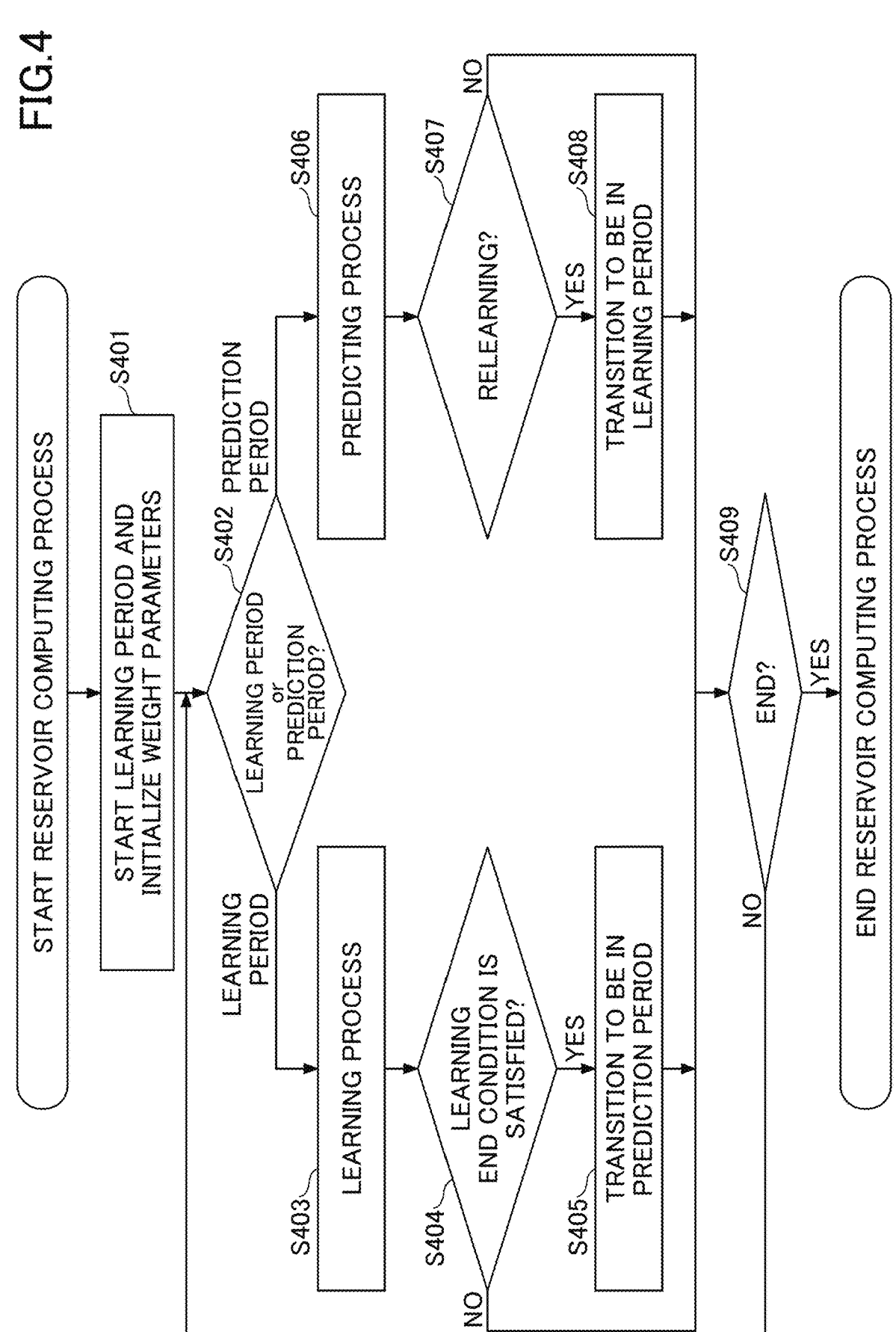

START RESERVOIR COMPUTING PROCESS

START LEARNING PERIOD AND INITIALIZE WEIGHT PARAMETERS — S401

LEARNING PERIOD or PREDICTION PERIOD? — S402

LEARNING PERIOD

LEARNING PROCESS — S403

LEARNING END CONDITION IS SATISFIED? — S404

NO

YES

TRANSITION TO BE IN PREDICTION PERIOD — S405

PREDICTION PERIOD

PREDICTING PROCESS — S406

RELEARNING? — S407

NO

YES

TRANSITION TO BE IN LEARNING PERIOD — S408

END? — S409

NO

YES

END RESERVOIR COMPUTING PROCESS

SUBSTRATE PROCESSING APPARATUS, DATA PROCESSING METHOD, AND DATA PROCESSING PROGRAM

TECHNICAL FIELD

The present disclosure relates to a substrate processing apparatus, a data processing method, and a data processing program.

BACKGROUND

Conventionally, in the field of substrate processing apparatuses, a state (for example, an anomaly is present or not) of a substrate manufacturing process is determined using time-series sensor data measured by various sensors. Recently, use of a machine learning model has also been proposed in order to improve determination accuracy.

RELATED ART DOCUMENT

Patent Document

Patent Document 1: Japanese Laid-open Patent Application Publication No. 2018-77779

Non-Patent Document

Non-Patent Document 1: David Sussillo, L. F. Abbott, "Generating Coherent Patterns of Activity from Chaotic Neural Networks", Neuron. Author manuscript; available in PMC 2010 Aug. 27

SUMMARY OF THE INVENTION

Problem to be Solved by the Invention

However, in a case of a general machine learning model, it is necessary to collect a large amount of training data in order to improve determination accuracy. Therefore, in a case of a substrate processing apparatus to which the machine learning model is applied, a workload required for learning work at the time of start-up is high. Additionally, even after the start-up, when the determination accuracy is reduced due to time-dependent changes of the substrate processing apparatus, it is necessary to collect a large amount of training data again. Therefore, in the case of a substrate processing apparatus to which a machine learning model is applied, a workload required for learning work at the time of maintenance is also high.

The present disclosure reduces a workload required for learning work in a substrate processing apparatus that determines a state of a substrate manufacturing process by using time-series sensor data.

Means for Solving Problem

A substrate processing apparatus according to an aspect of the present disclosure has, for example, the following configuration. A substrate processing apparatus includes a reservoir feature generating unit configured to receive first time-series sensor data acquired in a substrate manufacturing process and output a reservoir feature; a learning unit configured to learn, in a learning period, a weight parameter so that prediction result data obtained by performing calculations on the reservoir feature output from the reservoir feature generating unit under the weight parameter correlates with second time-series sensor data acquired in the substrate manufacturing process; a predicting unit configured to perform calculations, in a prediction period, on the reservoir feature output from the reservoir feature generating unit in response to the first time-series sensor data acquired in the substrate manufacturing process being input, under the weight parameter learned by the learning unit, to output prediction result data; and a determining unit configured to determine, in the prediction period, a state of the substrate manufacturing process by comparing the prediction result data with second time-series sensor data acquired in the substrate manufacturing process.

Effect of the Invention

A workload required for learning work can be reduced in a substrate processing apparatus that determines a state of a substrate manufacturing process by using time-series sensor data.

BRIEF DESCRIPTION OF THE DRAWINGS

FIG. 1 is a first diagram illustrating an example of a system configuration of a substrate processing apparatus.

FIG. 4 is a flowchart illustrating a flow of a reservoir computing process.

FIG. 12 is a second diagram illustrating an example of the system configuration of the substrate processing apparatus.

FIG. 14 is a third diagram illustrating an example of the system configuration of the substrate processing apparatus.

DESCRIPTION OF EMBODIMENTS

Figure 2:
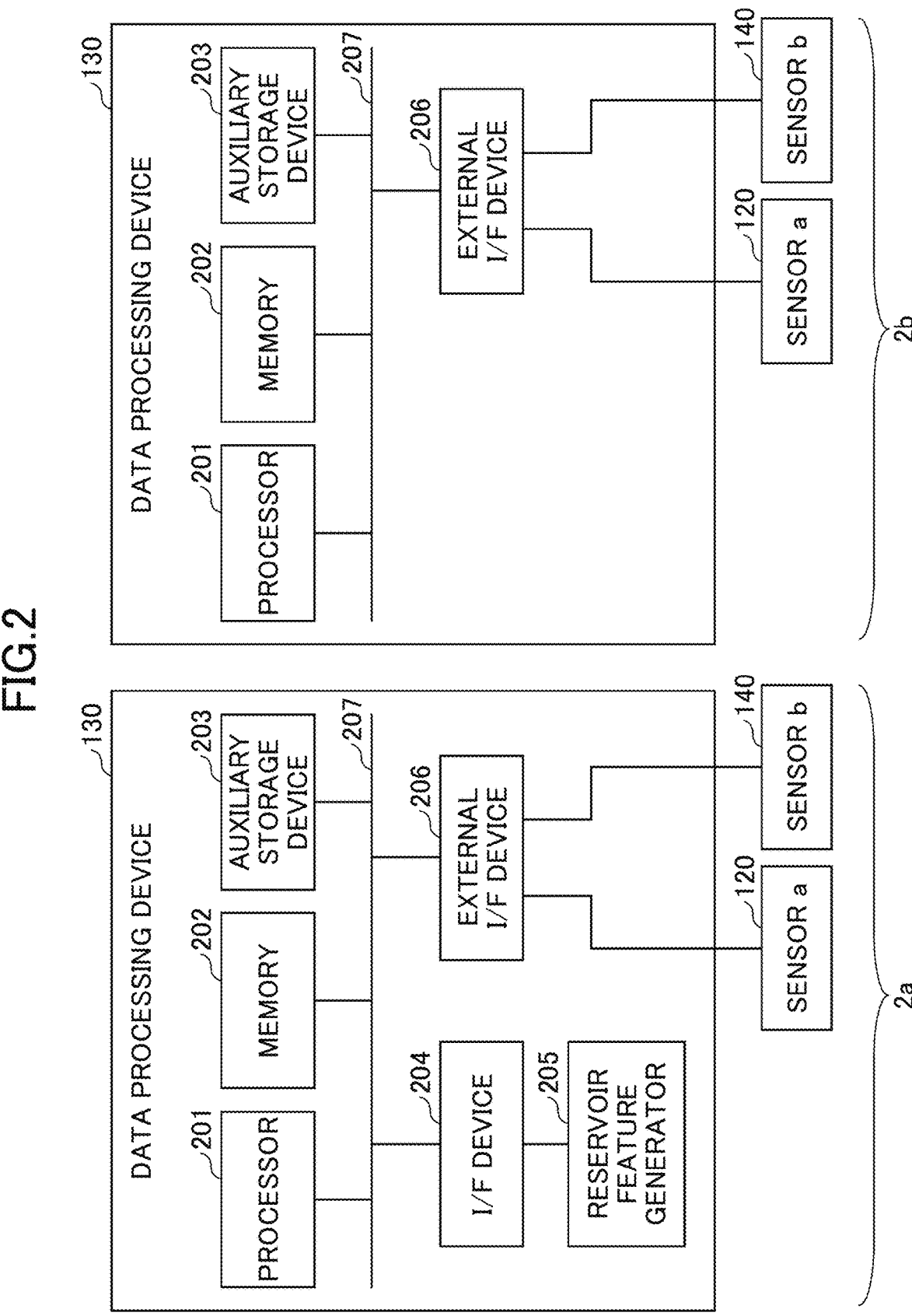
FIG. 2 is a diagram illustrating an example of a hardware configuration of a data processing device.

In the following, embodiments will be described with reference to the accompanying drawings. Here, in the present specification and the drawings, components having substantially the same functional configuration are denoted by the same reference symbols, and duplicated description thereof will be omitted.

First Embodiment

<System Configuration of Substrate Processing Apparatus>

Figure 1:
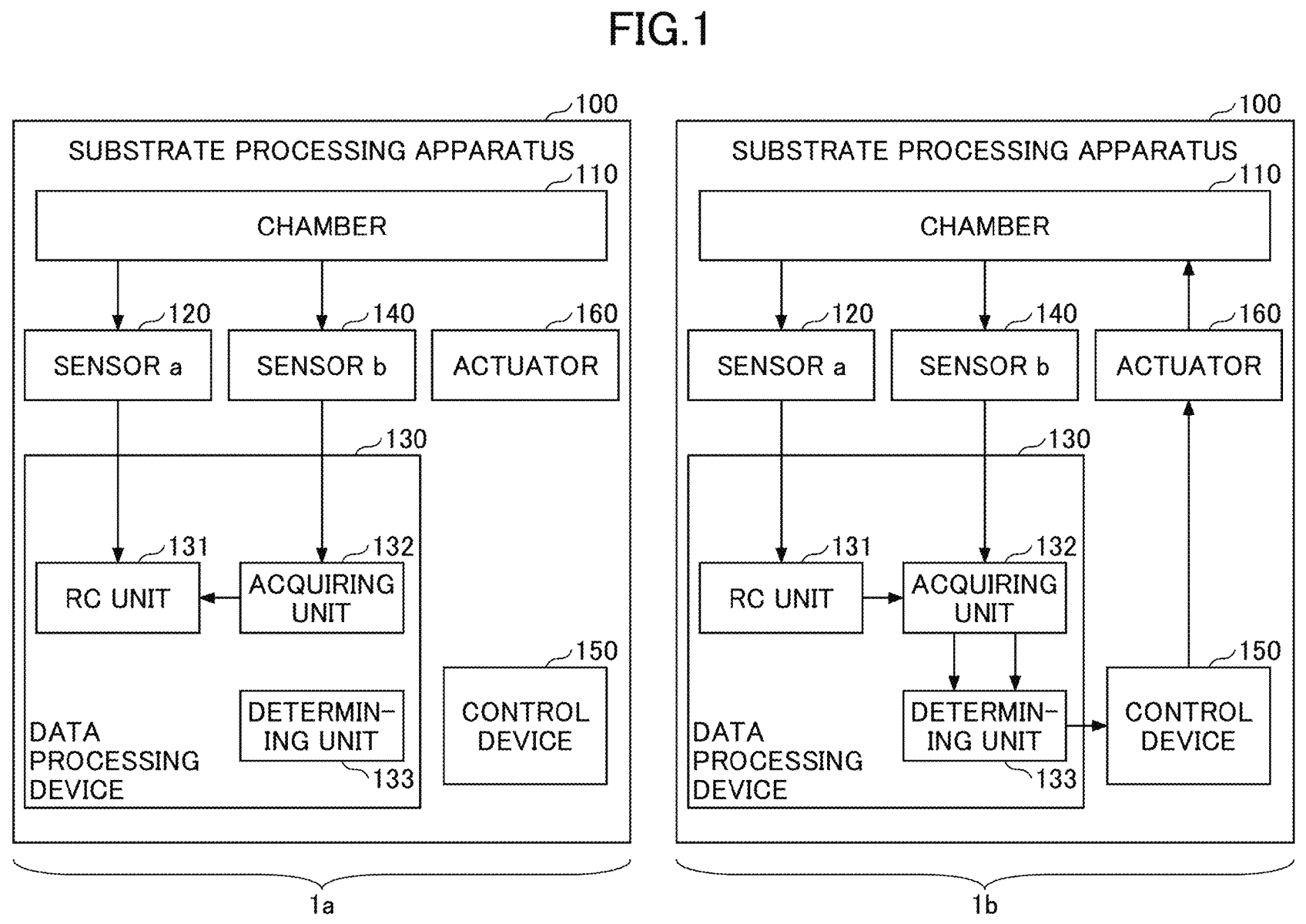

First, a system configuration of a substrate processing apparatus according to a first embodiment will be described. FIG. 1 is a first diagram illustrating an example of the system configuration of the substrate processing apparatus, and arrows in the diagram indicate data flows. In the drawing, 1a of FIG. 1 illustrates data flows in a substrate processing apparatus 100 in a learning period, and 1b of FIG. 1 illustrates data flows in the substrate processing apparatus 100 in a prediction period.

As illustrated in 1a and 1b of FIG. 1, the substrate processing apparatus 100 includes a chamber 110 for processing a substrate, a sensor a 120 (an example of a first sensor), a data processing device 130, a sensor b 140 (an example of a second sensor), a control device 150, and an actuator 160.

As illustrated in 1a and 1b of FIG. 1, during processing of the substrate in the chamber 110, time-series sensor data measured by the sensor a 120 is transmitted to a reservoir-computing unit (hereinafter referred to as an RC unit) 131 of the data processing device 130. That is, the time-series sensor data transmitted to the RC unit 131 is an example of first time-series sensor data acquired in a substrate manufacturing process.

The RC unit 131 realizes reservoir computing having a high expression capability and a high learning speed. Specifically, the RC unit 131 predicts time-series sensor data to be measured by the sensor b 140, based on the time-series sensor data (input data) measured by the sensor a 120.

Thus, as illustrated in 1a of FIG. 1, in the learning period, the RC unit 131 acquires the time-series sensor data (correct data) measured by the sensor b 140 via an acquiring unit 132 of the data processing device 130. Then, the RC unit 131 learns a weight parameter so that prediction result data, obtained by performing calculations using the time-series sensor data (the input data) measured by the sensor a 120 under the weight parameter, correlates with the correct answer data.

With respect to the above, as illustrated in 1b of FIG. 1, in the prediction period, the RC unit 131 performs calculations using the time-series sensor data (the input data) measured by the sensor a 120 under the learned weight parameter, and outputs time-series sensor data (prediction result data). Here, the time-series sensor data (the prediction result data) output by the RC unit 131 is notified to the acquiring unit 132 of the data processing device 130.

The sensor b 140 transmits time-series sensor data measured during processing of the substrate in the chamber 110 to the acquiring unit 132 of the data processing device 130. That is, the time-series sensor data transmitted to the acquiring unit 132 is an example of second time-series sensor data acquired in the substrate manufacturing process.

As illustrated in 1a of FIG. 1, in the learning period, the acquiring unit 132 of the data processing device 130 notifies the RC unit 131 of the time-series sensor data (the correct data) measured by the sensor b 140.

Additionally, as illustrated in 1b in FIG. 1, in the prediction period, the acquiring unit 132 of the data processing device 130 notifies a determining unit 133 of the prediction result data notified by the RC unit 131 and the time-series sensor data (comparison data) measured by the sensor b 140.

Here, the time-series sensor data measured by the sensor b 140 is referred to as the "correct data" in the learning period and is referred to as the "comparison data" in the prediction period.

Additionally, as illustrated in 1b of FIG. 1, in the prediction period, the determining unit 133 calculates a difference between the prediction result data and the comparison data notified by the acquiring unit 132, and determines a state of the substrate manufacturing process based on the calculated difference data. The determination result by the determining unit 133 is notified to the control device 150, and the control device 150 controls the actuator 160 according to the notified determination result.

As described above, in the substrate processing apparatus 100 that determines the state of the substrate manufacturing process by using the time-series sensor data, in the first embodiment, the RC unit 131 that realizes reservoir computing having a high expression capability and a high learning speed is included;

in the learning period, learning is performed by using two types of time-series sensor data as input data and correct data, and in the prediction period, the state of the substrate manufacturing process is determined by using two types of time-series sensor data as input data and comparison data.

With this, according to the substrate processing apparatus 100 of the first embodiment, at the time of start-up and at the time of maintenance, learning can be efficiently performed, and a workload for learning work can be reduced.

<Hardware Configuration of Data Processing Device>

Next, a hardware configuration of the data processing device 130 included in the substrate processing apparatus 100 will be described. FIG. 2 is a diagram illustrating an example of the hardware configuration of the data processing device. In this drawing, 2a of FIG. 2 illustrates a case where a reservoir feature generating function (details will be described later) is realized by a reservoir feature generator, which is hardware. Additionally, 2b of FIG. 2 illustrates a case where a reservoir feature generating function is realized by a computer executing software (for example, a reservoir feature generating program).

As illustrated in FIG. 2, the data processing device 130 includes a processor 201, a memory 202, an auxiliary storage device 203, and an external I/F device 206 (in the case of 2a of FIG. 2, further includes an I/F device 204 and a reservoir feature generator 205). Here, hardware components of the data processing device 130 are connected to one another via a bus 207.

The processors 201 in 2a and 2b of FIG. 2 each include various computing devices, such as CPUs and GPUs. The processor 201 reads various programs (for example, a data processing program to be described later, a data processing program including the reservoir feature generating program in the case of 2b of FIG. 2, and the like) onto the memory 202 and executes the programs.

The memories 202 in 2a and 2b of FIG. 2 each include a main storage device, such as a ROM and a RAM. The processor 201 and the memory 202 form what is called a computer. By the processor 201 executing various programs read onto the memory 202, the computer realizes various functions (the RC unit 131, the acquiring unit 132, and the determining unit 133).

The auxiliary storage devices 203 in 2a and 2b of FIG. 2 each store various programs and various date used when the various programs are executed by the processor 201.

The I/F device 204 in 2*a* of FIG. 2 is a connection device connected to the reservoir feature generator 205. The reservoir feature generator 205 in 2*a* of FIG. 2 is realized by, for example, a field-programmable gate array (FPGA) board or the like. The reservoir feature generator 205 has a reservoir feature generating function of receiving the time-series sensor data measured by the sensor a 120 and outputting a reservoir feature.

The external I/F devices 206 in 2*a* and 2*b* of FIG. 2 each are a connection device connected to the sensor a 120 and the sensor b 140.

<Functional Configuration of RC Unit of Data Processing Device>

Figure 3:
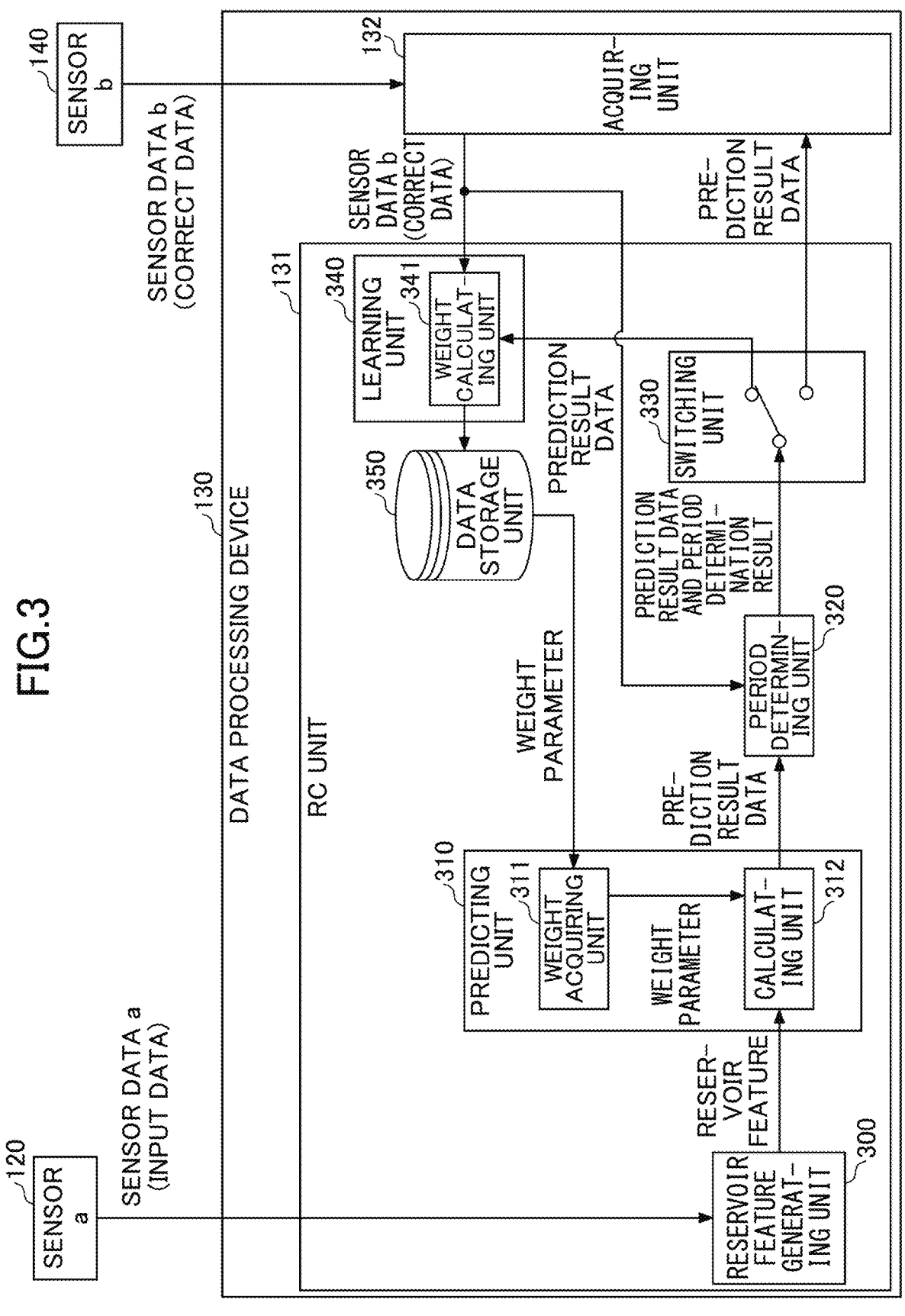
FIG. 3 is a first diagram illustrating an example of a functional configuration of an RC unit of the data processing device.

Next, a functional configuration of the RC unit 131 of the data processing device 130 will be described. FIG. 3 is a first diagram illustrating an example of the functional configuration of the RC unit of the data processing device.

As illustrated in FIG. 3, the RC unit 131 includes a reservoir feature generating unit 300, a predicting unit 310, a period determining unit 320, a switching unit 330, and a learning unit 340. In these units, the reservoir feature generating unit 300 may be realized by the reservoir feature generator 205, which is hardware such as an FPGA board, as described above. However, in the present embodiment, the reservoir feature generating unit 300 will be described as a function realized by a computer executing the reservoir feature generating program.

Additionally, the components from the predicting unit 310 through the learning unit 340 are functions realized by a computer executing a data processing program (a data processing program other than the reservoir feature generating program).

As illustrated in FIG. 3, the reservoir feature generating unit 300 has a reservoir feature generating function of receiving time-series sensor data a (input data) acquired from the sensor a 120 and outputting a reservoir feature.

The predicting unit 310 includes a weight acquiring unit 311 and a calculating unit 312. The weight acquiring unit 311 acquires weight parameter learned by the learning unit 340 and stored in a data storage unit 350, and sets the weight parameter in the calculating unit 312. Here, in the first learning of the learning period, default weight parameter may be set in the calculating unit 312 as initial values, and, for example, a value generated based on random numbers may be set.

The calculating unit 312 notifies the period determining unit 320 of prediction result data obtained by performing calculations on the reservoir feature output from the reservoir feature generating unit 300 based on the weight parameter set by the weight acquiring unit 311.

The period determining unit 320 determines whether the current period is the learning period or the prediction period based on the prediction result data notified from the calculating unit 312 and sensor data b (correct data) notified from the acquiring unit 132, and notifies the switching unit 330 of the period determination result. Additionally, the period determining unit 320 notifies the switching unit 330 of the prediction result data regardless of whether the current period is the learning period or the prediction period.

In the learning period, the switching unit 330 notifies the learning unit 340 of the prediction result data notified by the period determining unit 320. In the prediction period, the switching unit 330 notifies the acquiring unit 132 of the prediction result data notified by the period determining unit 320.

The learning unit 340 includes a weight calculating unit 341. The weight calculating unit 341 calculates error between:
  the sensor data b measured by the sensor b 140 and notified by the acquiring unit 132 as the correct data; and
  the prediction result data notified by the switching unit 330.

Additionally, the weight calculating unit 341 learns the weight parameter based on the calculated error. At this time, the weight calculating unit 341 learns the weight parameter by a matrix operation so that the error approaches 0 (that is, the prediction result data correlates with the correct data).

Additionally, the weight calculating unit 341 stores the learned weight parameter in the data storage unit 350. The data storage unit 350 is implemented in, for example, the auxiliary storage device 203 of the data processing device 130.

<Flow of Reservoir Computing Processing>

Next, a flow of a reservoir computing process by the RC unit 131 will be described. FIG. 4 is an example of a flowchart illustrating the flow of the reservoir computing process.

In step S401, when the RC unit 131 starts the learning period, the weight acquiring unit 311 of the predicting unit 310 initializes the weight parameter and sets the default weight parameter in the calculating unit 312. Additionally, the reservoir feature generating unit 300 starts receiving the time-series sensor data measured by the sensor a 120 and outputting the reservoir feature. This causes the calculating unit 312 of the predicting unit 310 to perform calculations on the output reservoir feature under the weight parameter to output the prediction result data.

In step S402, the period determining unit 320 determines whether the current period is the learning period or the prediction period. If it is determined in step S402 that the current period is the learning period, the switching unit 330 switches a notification destination of the prediction result to the learning unit 340, and the process proceeds to step S403. Here, in the present embodiment, the RC unit 131 starts the period from the learning period.

In step S403, the learning unit 340 performs a learning process of learning the weight parameter based on the prediction result notified by the switching unit 330 and the correct data.

In step S404, the period determining unit 320 determines whether a learning end condition is satisfied (whether a state in which there is no error between the correct data and the prediction result data has continued for a specified time). If it is determined in step S403 that the learning end condition is not satisfied, it is determined in step S404 not to transition to the prediction period (determined as NO in step S404), and the process proceeds to step S409.

If it is determined in step S403 that the learning end condition is satisfied, it is determined in step S404 to transition to the prediction period (determined as YES in step S404), and the process proceeds to step S405. Here, in this case, the weight acquiring unit 311 of the predicting unit 310 reads the weight parameter at the end of the learning from the data storage unit 350 and sets the weight parameter in the calculating unit 312.

In step S405, the period determining unit 320 transitions the current period to be in the prediction period, and the process proceeds to step S409. This causes the switching unit 330 to switch the notification destination of the prediction result data to the acquiring unit 132.

If it is determined in step S402 that the current period is the prediction period, the process proceeds to step S406.

In step S406, the calculating unit 312 of the predicting unit 310 performs a prediction process of performing calculations on the reservoir feature output from the reservoir feature generating unit 300 under the weight parameter at the end of learning, and outputting the prediction result.

In step S407, the period determining unit 320 determines whether relearning is necessary. If it is determined in step S407 that the relearning is not necessary (NO in step S407), the process proceeds to step S409. If it is determined in step S407 that the relearning is necessary (YES in step S407), the process proceeds to step S408.

In step S408, the period determining unit 320 transitions the current period to be in the learning period, and the process proceeds to step S409. This causes the switching unit 330 to switch the notification destination of the prediction result data to the learning unit 340.

In step S409, the RC unit 131 determines whether to end the reservoir computing process.

If it is determined in step S409 that the reservoir computing process is to be continued (NO in step S409), the process returns to step S402. If it is determined in step S409 that the reservoir computing process is to be ended (YES in step S409), the reservoir computing process is ended.

<Functional Configuration of Acquiring Unit and Determining Unit of Data Processing Device>

Figure 5:
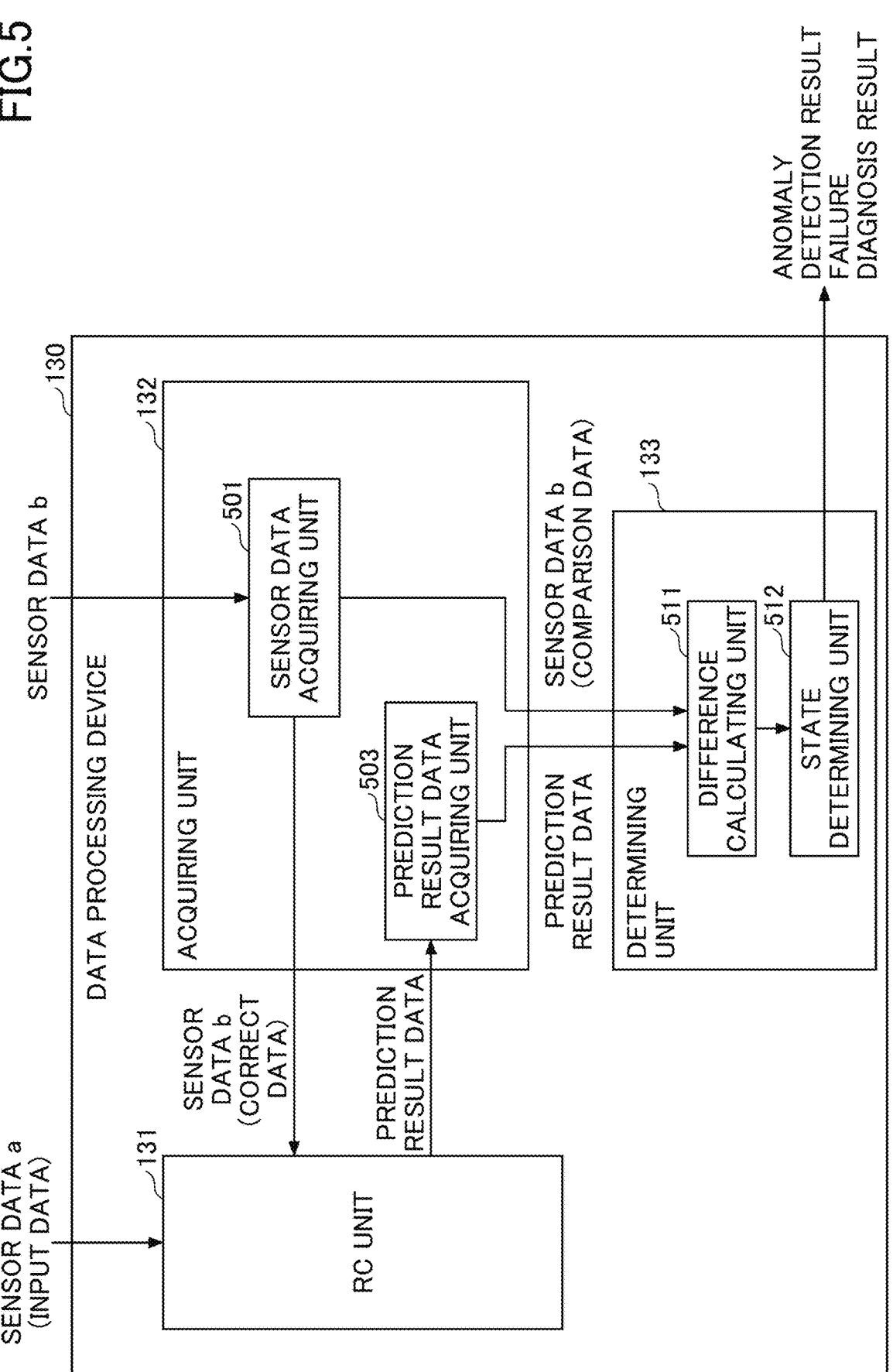
FIG. 5 is a diagram illustrating an example of a functional configuration of an acquiring unit and a determining unit of the data processing device.

Next, a functional configuration of the acquiring unit 132 and the determining unit 133 of the data processing device 130 will be described. FIG. 5 is a diagram illustrating an example of the functional configuration of the acquiring unit and the determining unit of the data processing device. As illustrated in FIG. 5, the acquiring unit 132 includes a sensor data acquiring unit 501 and a prediction result data acquiring unit 503. Additionally, the determining unit 133 includes a difference calculating unit 511 and a state determining unit 512.

The sensor data acquiring unit 501 notifies the RC unit 131 of the time-series sensor data b measured by the sensor b 140 as the correct data, and notifies the determining unit 133 of the time-series sensor data b as the comparison data.

In the prediction period, the prediction result data acquiring unit 503 acquires the prediction result data transmitted from the RC unit 131, and notifies the determining unit 133 of the prediction result data.

The difference calculating unit 511 calculates a difference between the comparison data notified from the sensor data acquiring unit 501 in the prediction period and the prediction result data transmitted from the RC unit 131 in the prediction period, and generates difference data. Additionally, the difference calculating unit 511 notifies the state determining unit 512 of the generated difference data.

The state determining unit 512 determines the state of the substrate manufacturing process. Specifically, the state determining unit 512 determines whether the difference data notified by the difference calculating unit 511 exceeds a predetermined threshold value. If it is determined that the predetermined threshold value is exceeded, the state determining unit 512 determines that an anomaly has occurred in the processed substrate. Additionally, the state determining unit 512 outputs an anomaly detection result indicating that an anomaly has occurred.

Additionally, the state determining unit 512 determines whether a change pattern in a predetermined time range is similar to a predetermined change pattern with respect to the difference data notified by the difference calculating unit 511. If it is determined that the change pattern is similar to the predetermined change pattern, the state determining unit 512 determines that an anomaly has occurred or a failure has occurred in the substrate processing apparatus 100. Additionally, the state determining unit 512 outputs a failure diagnosis result indicating that an anomaly has occurred or a failure has occurred in the substrate processing apparatus 100 to the control device 150. This allows the control device 150 to notify the actuator 160 of a stop command if an anomaly occurs or a failure occurs.

<Flow of Acquiring and Determining Process>

Figure 6:
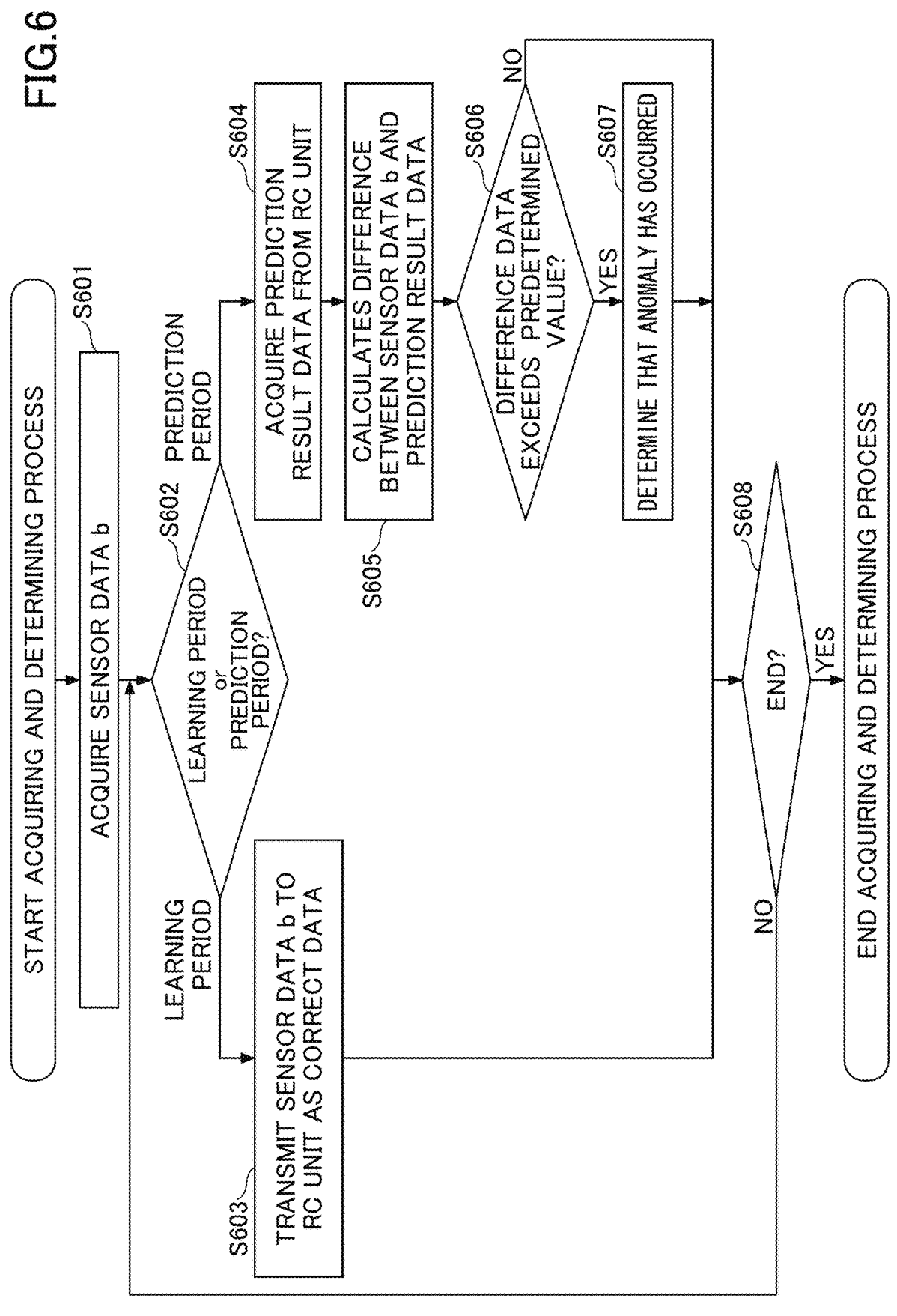
FIG. 6 is a first flowchart illustrating a flow of an acquisition and determination process.

Next, as a flow of an acquiring and determining process by the acquiring unit 132 and the determining unit 133 of the data processing device 130, a flow of an acquiring and determining process in a case where an anomaly detection result is output will be described. FIG. 6 is a first flowchart illustrating the flow of the acquiring and determining process.

In step S601, the acquiring unit 132 of the data processing device 130 acquires the time-series sensor data b measured by the sensor b 140.

In step S602, the acquiring unit 132 of the data processing device 130 determines whether the current period is the learning period or the prediction period. If it is determined in step S602 that the current period is the learning period, the process proceeds to step S603.

In step S603, the acquiring unit 132 of the data processing device 130 transmits the acquired sensor data b to the RC unit 131 as the correct data.

If it is determined in step S602 that the current period is the prediction period, the process proceeds to step S604.

In step S604, the acquiring unit 132 of the data processing device 130 acquires the prediction result data transmitted from the RC unit 131.

In step S605, the determining unit 133 of the data processing device 130 compares the sensor data b acquired from the sensor b 140, as the comparison data, with the prediction result data acquired from the RC unit 131, and calculates the difference data.

In step S606, the determining unit 133 of the data processing device 130 determines whether the difference data exceeds a predetermined threshold value. If it is determined in step S606 that the predetermined threshold value is exceeded (YES in step S606), the process proceeds to step S607.

In step S607, the determining unit 133 of the data processing device 130 determines that an anomaly has occurred in the processed substrate, outputs, to the control device 150, the anomaly detection result indicating that an anomaly has occurred, and then the process proceeds to step S608.

If it is determined in step S606 that the predetermined threshold value is not exceeded (NO in step S606), the process proceeds directly to step S608.

In step S608, the acquiring unit 132 of the data processing device 130 determines whether to end the acquiring and determining process. If it is determined in step S608 that the acquiring and determining process is not to be ended (NO in step S608), the process returns to step S602. If it is determined in step S608 that the acquiring and determining process is to be ended (YES in step S608), the acquiring and determining process is ended.

Figure 7:
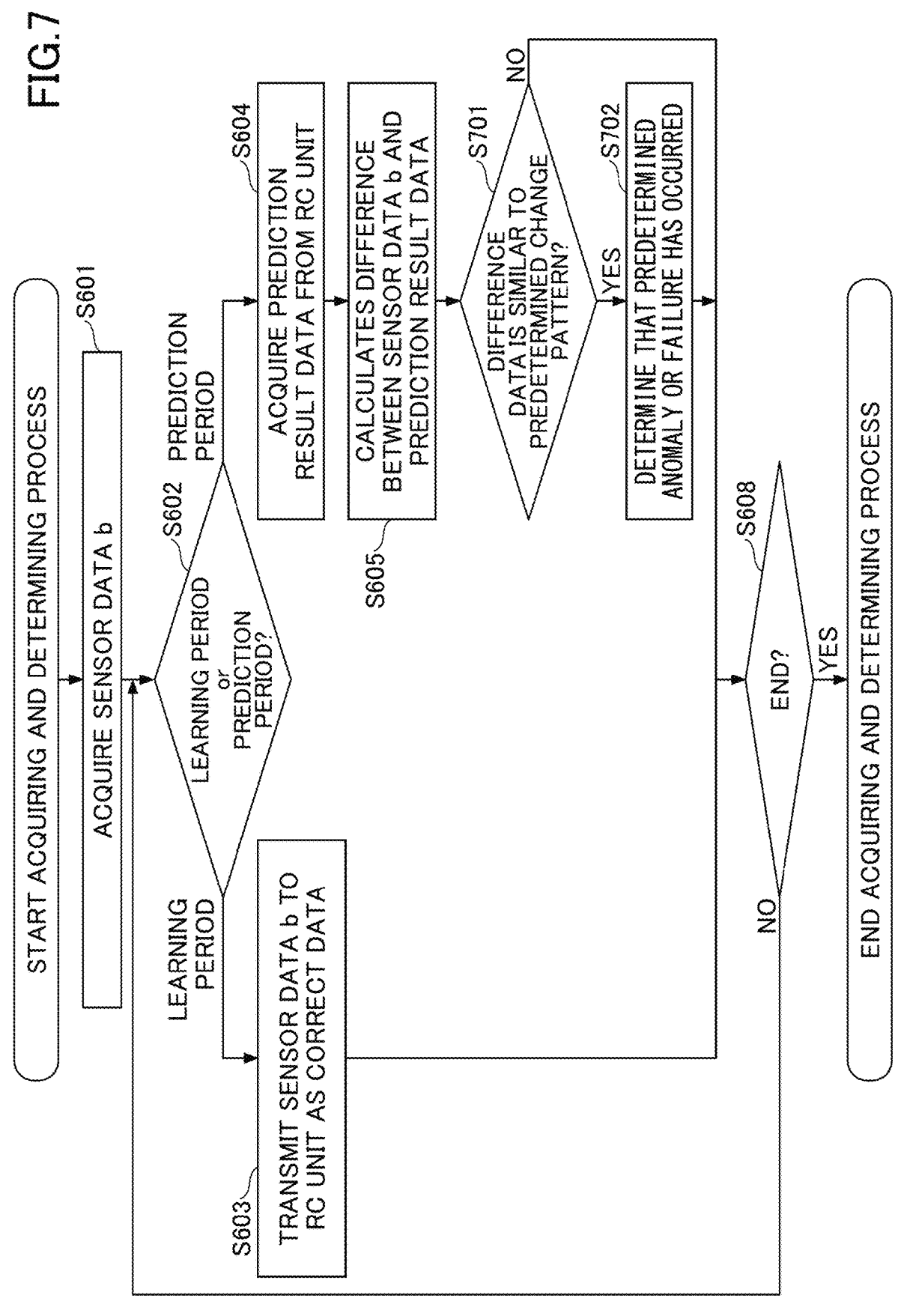
FIG. 7 is a second flowchart illustrating the flow of the acquisition and determination process.

Subsequently, as the flow of the acquiring and determining process by the acquiring unit 132 and the determining unit 133 of the data processing device 130, a flow of the acquiring and determining process in a case where the failure diagnosis result is output will be described. FIG. 7 is a second flowchart illustrating the flow of the acquiring and determining process.

The differences from the first flowchart illustrated in FIG. 6 are step S701 and step S702. Thus, step S701 and step S702 will be described here.

In step S701, the determining unit 133 of the data processing device 130 determines whether the change pattern of the difference data in the predetermined time range is similar to the predetermined change pattern. If it is determined in step S701 that the change pattern is similar to the predetermined change pattern (YES in step S701), the process proceeds to step S702.

In step S702, the determining unit 133 of the data processing device 130 determines that an anomaly has occurred or a failure has occurred in the substrate processing apparatus 100, outputs the failure diagnostic result to the control device 150, and then the process proceeds to step S608.

If it is determined in step S702 that the change pattern is not similar to the predetermined change pattern (NO in step S702), the process proceeds directly to step S608.

<Specific Example of Acquiring and Determining Process>

Figure 8:
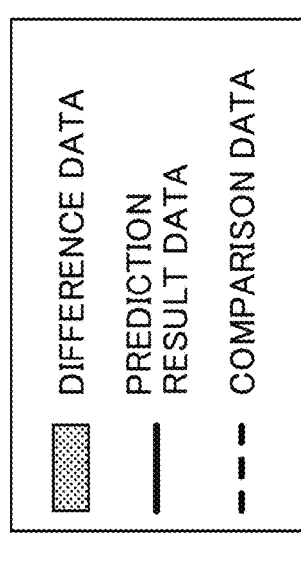
FIG. 8 is a diagram illustrating a specific example of the acquisition and determination process.

Next, a specific example of the acquiring and determining process by the acquiring unit 132 and the determining unit 133 of the data processing device 130 will be described. FIG. 8 is a diagram illustrating a specific example of the acquiring and determining process. In FIG. 8, the horizontal axis represents time and the vertical axis represents data values.

Additionally, in FIG. 8, a line graph 801 represents the prediction result data transmitted from the RC unit 131, and a line graph 802 represents the time series sensor data b (the comparison data) measured by the sensor b 140. Additionally, a bar graph 803 represents difference data calculated from the difference between the prediction result data and the comparison data.

In the example of FIG. 8, it is indicated that when the difference between the prediction result data and the comparison data exceeds a predetermined threshold value at the timing indicated by a reference numeral 810, it is determined that an anomaly has occurred, and the anomaly detection result is output.

Additionally, in the example of FIG. 8, it is indicated that the change pattern of the difference data in the time range indicated by a reference numeral 820 is determined not to be similar to the predetermined change pattern.

With respect to the above, in the example of FIG. 8, it is indicated that because the change pattern of the difference data in the time range indicated by a reference numeral 830 is similar to the predetermined change pattern, it is determined that a failure has occurred in the substrate processing apparatus 100, and the failure diagnosis result is output.

SUMMARY

As is apparent from the above description, the substrate processing apparatus 100 according to the first embodiment:
  includes the reservoir feature generating unit, receives the time-series sensor data a acquired in the substrate manufacturing process (the time-series sensor data a measured by the sensor a), and outputs the reservoir feature;
  learns, in the learning period, the weight parameter so that the prediction result data obtained by calculating the reservoir feature output from the reservoir feature generating unit under the weight parameter correlates with the time-series sensor data b measured by the sensor b.
  perform calculations on, in the prediction period, the reservoir feature output from the reservoir feature generating unit under the learned weight parameter in response to receiving the time-series sensor data a acquired in the substrate manufacturing process, and outputs the prediction result; and
  compares the prediction result data with the time-series sensor data b acquired in the substrate manufacturing process to determine the state of the substrate manufacturing process.

With this, according to the substrate processing apparatus 100 of the first embodiment, the learning can be efficiently performed at the time of start-up and maintenance. As a result, according to the first embodiment, in the substrate processing apparatus that determines the state of the substrate manufacturing process by using the time-series sensor data, the workload required for the learning work can be reduced.

Second Embodiment

In the first embodiment described above, the case where the RC unit 131 includes only one set of reservoir feature generating unit has been described. However, the number of the reservoir feature generating units included in the RC unit 131 is not limited to one set, and, for example, multiple sets may be included. In the following, a second embodiment will be described focusing on differences from the first embodiment.

<Functional Configuration of RC Unit of Data Processing Device>

Figure 9:
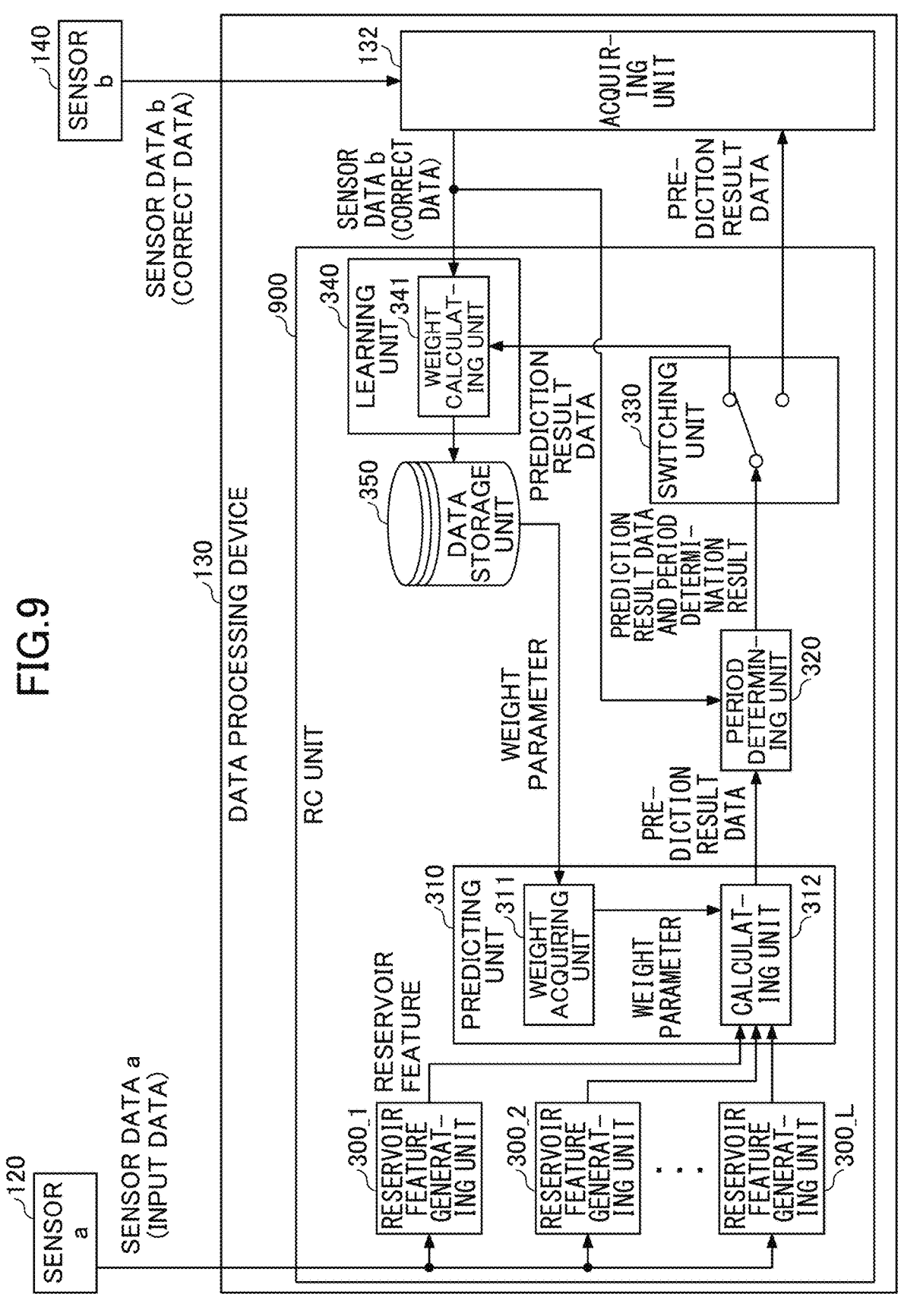
FIG. 9 is a second diagram illustrating an example of the functional configuration of the RC unit of the data processing device.

First, a functional configuration of a RC unit 900 in a data processing device 130 of a substrate processing apparatus 100 according to the second embodiment will be described. FIG. 9 is a second diagram illustrating an example of the functional configuration of the RC unit of the data processing device.

In FIG. 9, the differences from the functional configuration in the first diagram illustrated in FIG. 3 are as follows:
  the RC unit 900 includes multiple reservoir feature generating units 300_1 to 300_L (L is a suitable integer);
  the time-series sensor data a measured by the sensor a 120 is input in parallel to the multiple reservoir feature generating units 300_1 to 300_L; and
  the reservoir features output from the multiple reservoir feature generating units 300_1 to 300_L are input in parallel into the calculating unit 312 of the predicting unit 310.

This allows the calculating unit 312 to notify the period determining unit 320 of the prediction result data obtained by performing weighted addition on the reservoir features output from the multiple reservoir feature generating units 300_1 to 300_L by using weight parameters.

SUMMARY

As is apparent from the above description, the substrate processing apparatus 100 according to the second embodiment:
  includes multiple reservoir feature generating units, receives the time-series sensor data a acquired in the substrate manufacturing process (the time-series sensor data a measured by the sensor a) in parallel, and outputs the reservoir features;
  learns, in the learning period, the weight parameters so that the prediction result data obtained by performing weighted addition on the reservoir features output from the multiple reservoir feature generating units by using the weight parameters correlates with the time-series sensor data b;

performs weighted addition, in the prediction period, the reservoir features output from the multiple reservoir feature generating units in response to receiving the time-series sensor data a acquired in the substrate manufacturing process in parallel by using the learned weight parameters, and outputs the prediction result data; and compares the prediction result data with the time-series sensor data b acquired in the substrate manufacturing process to determine the state of the substrate manufacturing process.

With this, according to the substrate processing apparatus 100 of the second embodiment, highly accurate prediction result data can be further output while the same effects as those of the first embodiment are obtained.

Third Embodiment

In the first and second embodiments, the case where the data processing device 130 includes only one set of the RC unit 131 has been described. However, the number of the RC units included in the data processing device is not limited to one set, and, for example, multiple sets may be included. In the following, a third embodiment will be described focusing on differences from the first and second embodiments.

<Functional Configuration of RC Unit of Data Processing Device>

Figure 10A:
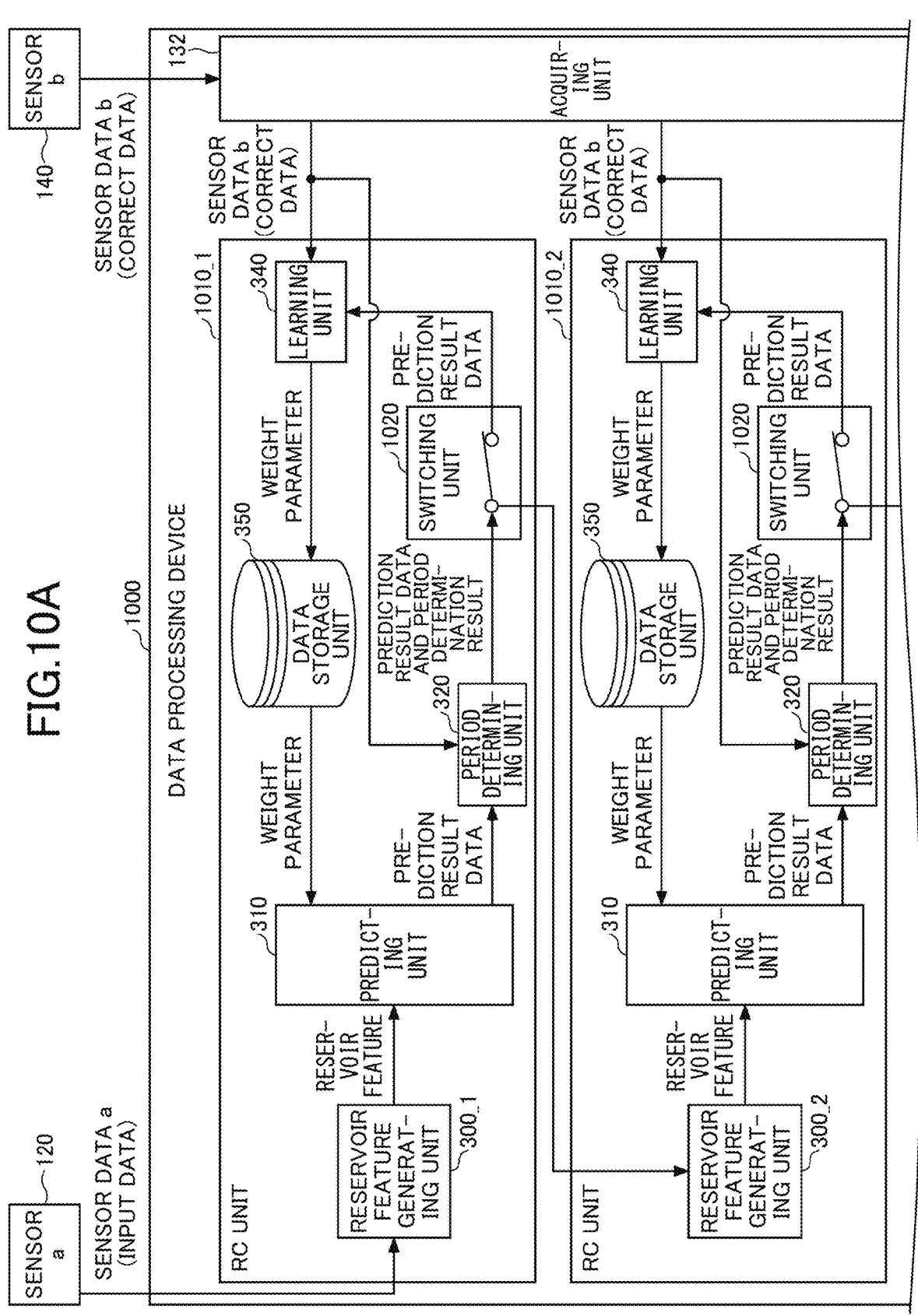
FIG. 10A is a third diagram illustrating an example of the functional configuration of the RC unit of the data processing device.
Figure 10B:
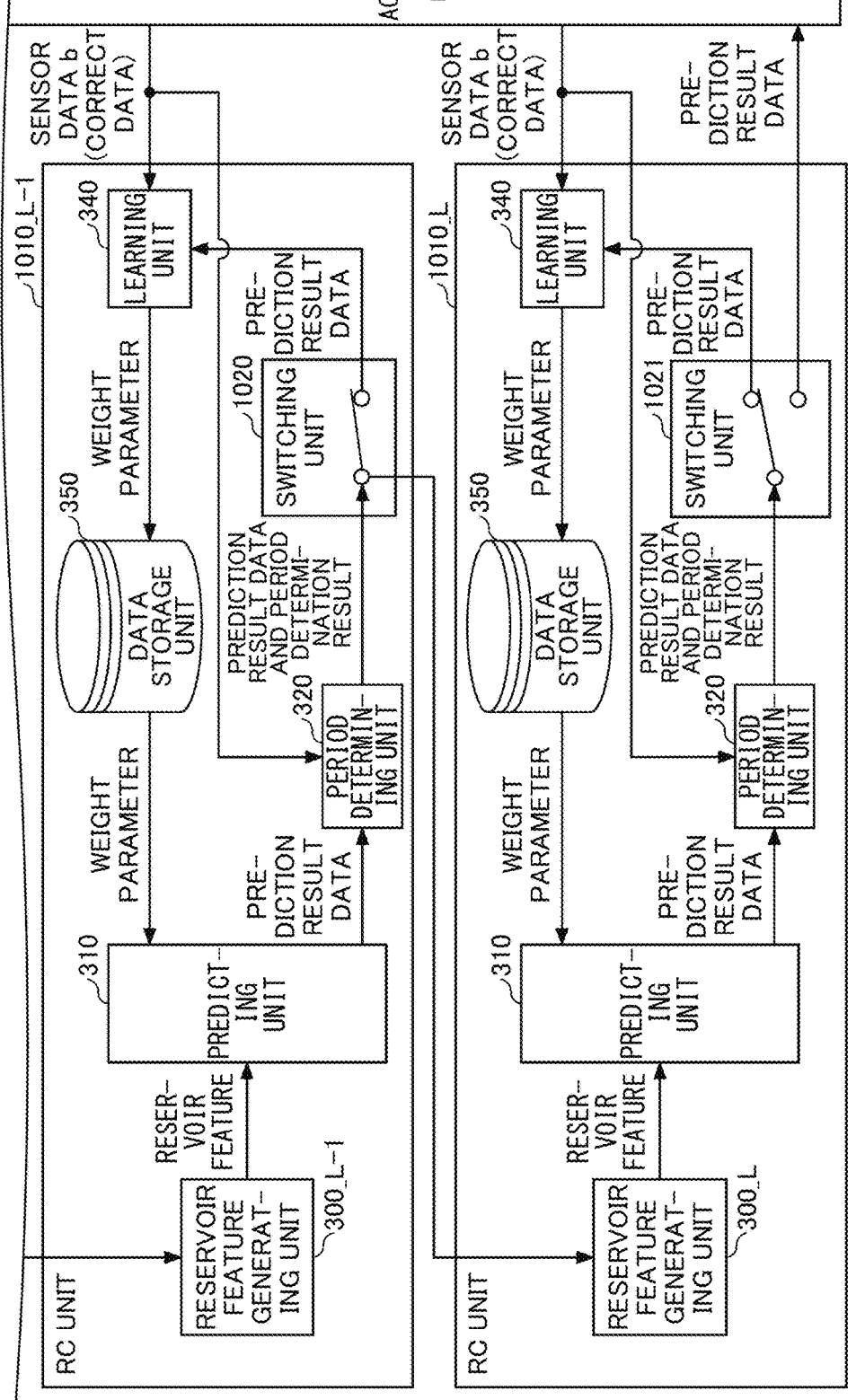
FIG. 10B is a fourth diagram illustrating the example of the functional configuration of the RC unit of the data processing device.

First, a functional configuration of a RC unit of a data processing device 1000 included in a substrate processing apparatus 100 according to the third embodiment will be described. FIG. 10A and FIG. 10B are third and fourth diagrams illustrating an example of the functional configuration of the RC unit of the data processing device.

In FIG. 10A and FIG. 10B, the differences from the functional configuration in the first diagram illustrated in FIG. 3 are as follows:

multiple RC units 1010_1 to 1010_L are connected in series;

the time-series sensor data measured by the sensor a 120 is input to the RC unit 1010_1, which is at the starting end;

in the learning period, the prediction result data output from the predicting units 310 of the RC units 1010_1 to 1010_L-1 are input into the reservoir feature generating units 300_2 to 300_L of the next RC units;

in the learning period, a switching unit 1020 of each of the RC units 1010_1 to 1010_L-1 is in the ON state, the prediction result data output from the corresponding predicting unit 310 is input into the corresponding learning unit 340, and learning is performed by the learning unit 340;

in the learning period, a switching unit 1021 of the RC unit 1010_L, which is at the terminal end, is switched to the learning unit 340 side, and learning is performed in the learning unit 340 in response to the prediction result data output from the predicting unit 310 being input into the learning unit 340;

in the prediction period, the switching unit 1020 of each of the RC units 1010_1 to 1010_L-1 is in the OFF state, and the prediction result data output from the corresponding predicting units 310 are input into the reservoir feature generating units 300_2 to 300_L of the next RC units; and in the prediction period, the switching unit 1021 of the RC unit 1010_L, which is at the terminal end, is switched to the acquiring unit 132 side, and the final prediction result data output from the corresponding predicting unit 310 is output to the acquiring unit 132.

SUMMARY

As is apparent from the above description, the substrate processing apparatus 100 according to the third embodiment:

includes multiple RC units connected in series, and in the prediction period, the time-series sensor data a acquired in the substrate manufacturing process (the time-series sensor data a measured by the sensor a) is input into the RC unit at the starting end, and the final prediction result data is output from the RC unit at the terminal end;

in the learning period and the prediction period, inputs the prediction result data output from the immediately preceding RC units into the reservoir feature generating units included in RC units after the RC unit at the starting end;

in the learning period, each RC unit learns the weight parameter so that the prediction result data obtained by performing calculations under the weight parameter correlates with the time-series sensor data b measured by the sensor b;

in the prediction period, each RC unit performs calculations on the reservoir feature output from the reservoir feature generating unit under the learned weight parameter and outputs the prediction result data; and compares the final prediction result data with the time-series sensor data b acquired in the substrate manufacturing process to determine the state of the substrate manufacturing process.

With this, according to the substrate processing apparatus 100 of the third embodiment, highly accurate prediction result data can be further output while the same effects as those of the first embodiment are obtained.

Fourth Embodiment

In the third embodiment described above, the case where multiple sets of RC units included in the data processing device 1000 are connected in series has been described. In a fourth embodiment, a case where multiple sets of RC units are connected in parallel will be described. Hereinafter, the fourth embodiment will be described focusing on differences from the third embodiment.

<Functional Configuration of RC Unit and Integrating Unit of Data Processing Device>

Figure 11:
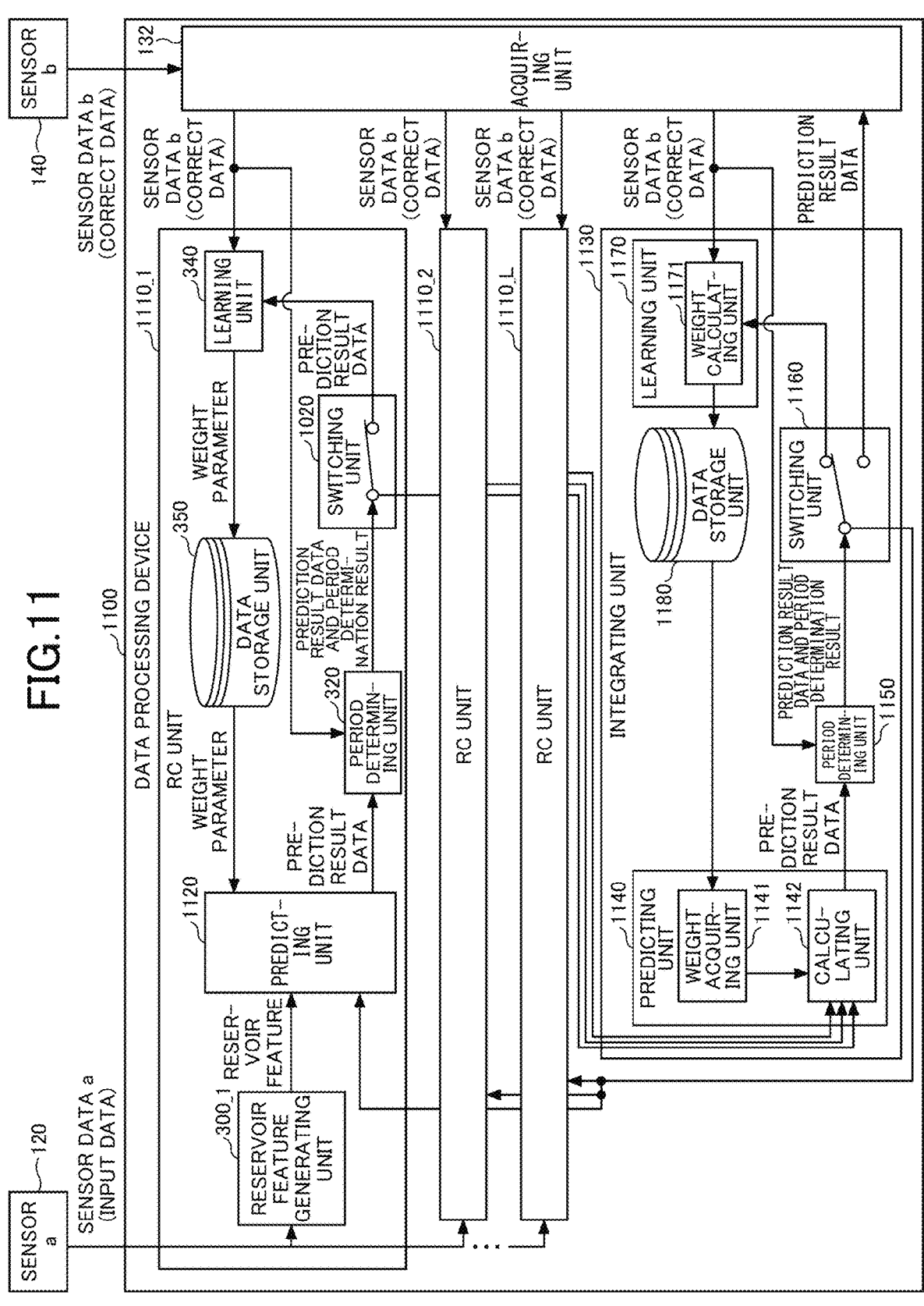
FIG. 11 is a diagram illustrating an example of a functional configuration of the RC unit and an integrating unit of the data processing device.

First, a functional configuration of an RC unit and an integrating unit of a data processing device 1100 included in a substrate processing apparatus 100 according to the fourth embodiment will be described. FIG. 11 is a diagram illustrating an example of the functional configuration of the RC unit and the integrating unit of the data processing device.

In FIG. 11, the differences from the functional configuration illustrated in FIG. 10A and FIG. 10B are following:

multiple RC units 1110_1 to 1010_L are connected in parallel; and an integrating unit 1130 is connected in series to the multiple RC units 1110_1 to 1010_L.

Additionally, in FIG. 11, the integrating unit 1130 includes a predicting unit 1140 (an example of an integrated predicting unit), a period determining unit 1150, a switching unit 1160, and a learning unit 1170 (an example of an integrated learning unit), the predicting unit 1140 further includes a weight acquiring unit 1141 and a calculating unit 1142, and the weight acquiring unit 1141 acquires weight parameters learned by the learning unit 1170 and stored in a data storage unit 1180 and sets the weight parameters in the calculating unit 1142, the calculating unit 1142 performs weighted addition on the prediction result data output from a predicting unit 1120 of each of the RC units 1110_1 to 1110_L by using the weight parameters set by the weight acquiring unit 1141 and notifies the period determining unit 1150 of the prediction result data, in the learning period, the switching unit 1160 notifies the learning unit 1170 and the predicting unit 1120 of each of the RC units 1110_1 to 1110_L of the prediction result data notified by the period determining unit 1150, in the prediction period, the switching unit 1160 notifies the acquiring unit 132 and the predicting unit 1120 of each of the RC units 1110_1 to 1110_L of the prediction result data notified by the period determining unit 1150 as the final prediction result data, the learning unit 1170 includes a weight calculating unit 1171, in the learning period, the weight calculating unit 1171 calculates the error between the sensor data b that is measured by the sensor b 140 and that is notified by the acquiring unit 132 as the correct data and the prediction result data that is notified by the switching unit 1160, and in the learning period, the weight calculating unit 1171 learns the weight parameters based on the calculated error and stores the weight parameters obtained by the learning in the data storage unit 1180. Additionally, in FIG. 11, the time-series sensor data measured by the sensor a 120 is input in parallel into the reservoir feature generating units 300_1 to 300_L of the RC units 1110_1 to 1110_L, and the reservoir features are output, in the learning period, the predicting unit 1120 corresponding to each of the RC units 1110_1 to 1110_L performs calculations on the reservoir feature under a weight parameter, corrects the prediction result data obtained by performing calculations based on the prediction result data notified by the integrating unit 1130, and outputs the corrected prediction result data, in the prediction period, the predicting unit 1120 corresponding to each of the RC units 1110_1 to 1110_L performs calculations on the reservoir feature under the weight parameter, corrects the prediction result data obtained by performing calculations based on the prediction result data notified by the integrating unit 1130, and outputs the corrected prediction result data, in the learning period and the prediction period, the prediction result data output from the predicting unit 1120 corresponding to each of the RC units 1110_1 to 1110_L is input into the integrating unit 1130, and in the learning period, the switching unit 1020 corresponding to each of the RC units 1110_1 to 1110_L is in the ON state, the prediction result data output from the corresponding predicting unit 1120 is input into the corresponding learning unit 340, and learning is performed by the learning unit 340.

SUMMARY

As is apparent from the above description, the substrate processing apparatus 100 according to the fourth embodiment:

includes multiple RC units connected in parallel, respective RC units receive the time-series sensor data a acquired in the substrate manufacturing process (the time-series sensor data a measured by the sensor a) in parallel, and output respective prediction result data to the integrating unit;

integrates, in the prediction period, the prediction result data respectively output from the multiple RC units under the weight parameters in the integrating unit, and outputs it as the final prediction result data;

in the learning period, each RC unit learns the weight parameter so that each prediction result data obtained by performing calculations based on the weight parameter correlates with the time-series sensor data b measured by the sensor b;

inputs, in the learning period and the prediction period, the prediction result data integrated by the integrating unit into the predicting unit of each RC unit, and corrects the prediction result data obtained by performing calculations on the reservoir feature under the weight parameter;

in the learning period, the integrating unit learns the weight parameters so that the integrated prediction result data correlates with the time-series sensor data b measured by the sensor b; and compares, in the prediction period, the final prediction result data with the time-series sensor data b acquired in the substrate manufacturing process to determine the state of the substrate manufacturing process.

With this, according to the substrate processing apparatus 100 of the third embodiment, highly accurate prediction result data can be further output while the same effects as those of the first embodiment are obtained.

Fifth Embodiment

In the first to fourth embodiments described above, the case where the time-series sensor data measured by one sensor b 140 is predicted based on the time-series sensor data measured by one sensor a 120 has been described. With respect to the above, in a fifth embodiment, the time-series sensor data measured by one sensor b 140 is predicted based on time-series sensor data measured by multiple sensors. In the following, the fifth embodiment will be described focusing on differences from the first embodiment.

<System Configuration of Substrate Processing Apparatus>

Figure 12:
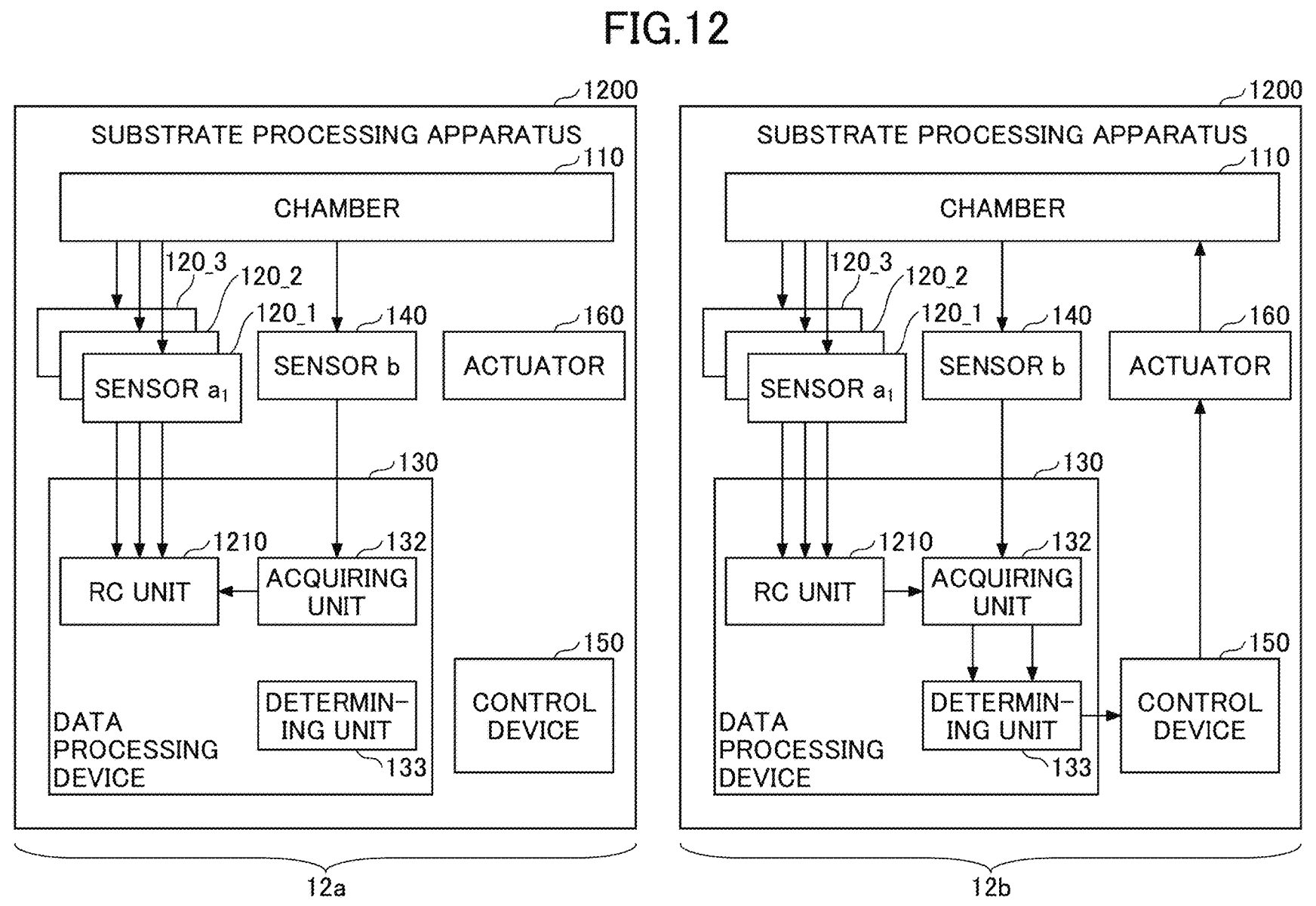

First, a system configuration of a substrate processing apparatus according to the fifth embodiment will be described. FIG. 12 is a second diagram illustrating an example of the system configuration of the substrate processing apparatus. In FIG. 12, differences from the system configuration illustrated in FIG. 1 are that a sensor $a_{1\_}$ to a sensor $a_3$120_3 (another example of the first sensor) are arranged instead of the sensor a 120, and a function of an RC unit 1210 is different from the function of the RC unit 131.

Here, as in FIG. 1, 12a of FIG. 12 indicates data flows in a substrate processing apparatus 1200 in the learning period, and 12b of FIG. 12 indicates data flows in the substrate processing apparatus 1200 in the prediction period.

As illustrated in 12a and 12b of FIG. 12, time-series sensor data measured by the sensor $a_1$120_1 to the sensor $a_3$120_3 (another example of the first sensor data) during the processing of the substrate in the chamber 110 is transmitted to the RC unit 1210.

The RC unit 1210 realizes reservoir computing having a high expression capability and a high learning speed. For example, the RC unit 1210 predicts the time-series sensor data measured by the sensor b 140 based on the time-series sensor data (the input data) measured by the sensor $a_1$120_1 to the sensor $a_3$120_3.

Thus, as illustrated in 12$a$ of FIG. 12, in the learning period, the RC unit 1210 acquires the time-series sensor data (the correct data) measured by the sensor b 140 via the acquiring unit 132 of the data processing device 130. Then, the RC unit 1210 learns weight parameters so that the prediction result data obtained by calculating the time-series sensor data (the input data) measured by the sensors $a_1$120_1 to $a_3$120_3 under the weight parameters correlates with the correct data.

With respect to the above, as illustrated in 12$b$ of FIG. 12, in the prediction period, the RC unit 1210 performs calculations on the time-series sensor data (the input data) measured by the sensor $a_1$120_1 to the sensor $a_3$120_3 under the learned weight parameters. This allows the RC unit 1210 to output the time-series sensor data (the prediction result data). Here, the time-series sensor data (the prediction result data) output by the RC unit 1210 is notified to the acquiring unit 132 of the data processing device 130.

<Functional Configuration of RC Unit of Data Processing Device>

Figure 13:
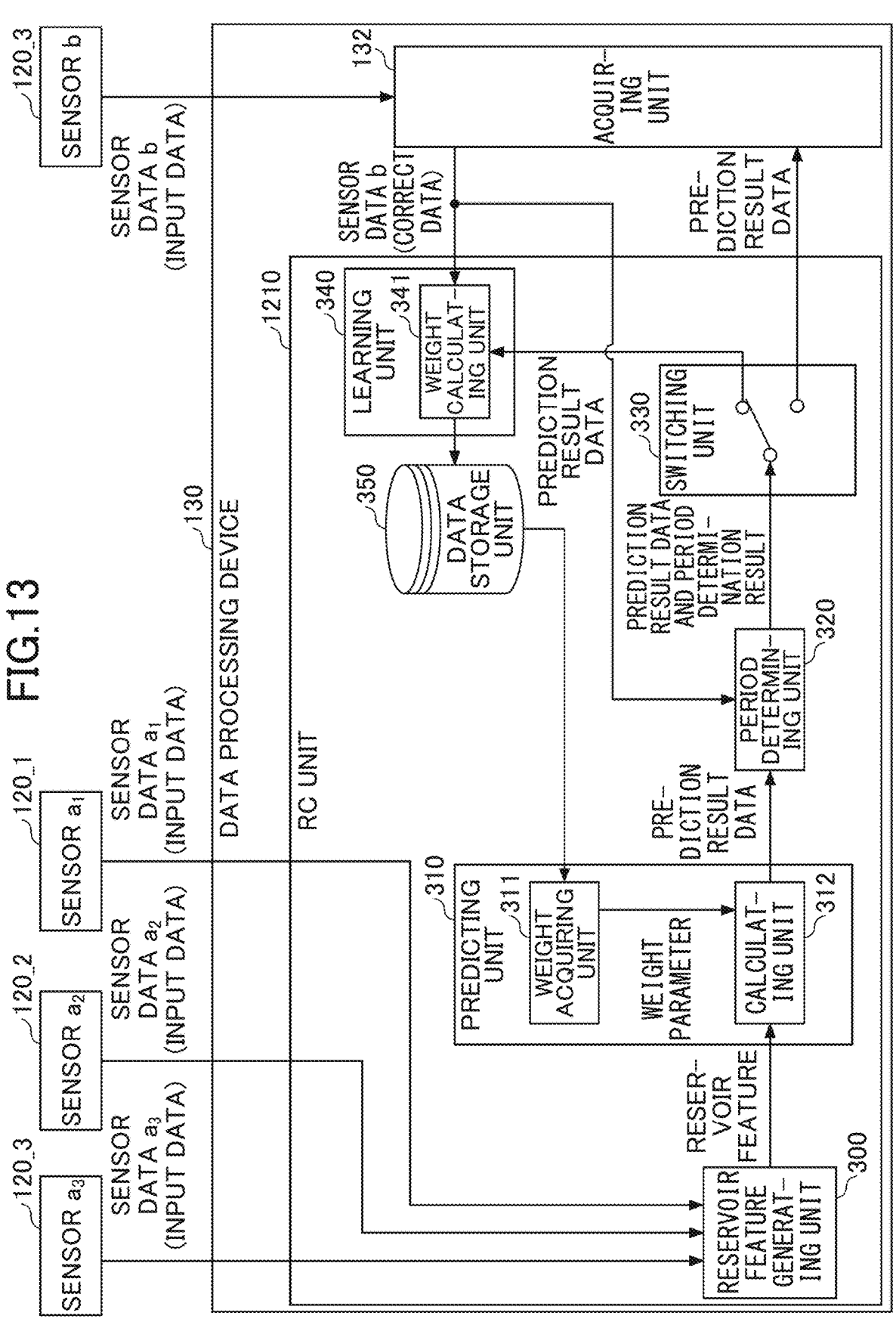
FIG. 13 is a fifth diagram illustrating an example of the functional configuration of the RC unit of the data processing device.

Next, a functional configuration of the RC unit 1210 in the data processing device 130 of the substrate processing apparatus 1200 according to the fifth embodiment will be described. FIG. 13 is a fifth diagram illustrating an example of the functional configuration of the RC unit of the data processing device.

In FIG. 13, a difference from the functional configuration of the first diagram illustrated in FIG. 3 is:

the time-series sensor data $a_1$ to sensor data $a_3$ measured by the sensor $a_1$120_1 to sensor $a_3$120_3 are input into the reservoir feature generating unit 300.

This allows the calculating unit 312 to receive the reservoir feature based on the time-series sensor data a: to as respectively measured by the multiple sensors $a_1$120_1 to $a_3$120_3, and output the prediction result data.

SUMMARY

As is apparent from the above description, the substrate processing apparatus 100 according to the fifth embodiment:

includes the reservoir feature generating unit, receives each of multiple time-series sensor data $a_1$ to $a_3$ acquired in the substrate manufacturing process (multiple time-series sensor data $a_1$ to $a_3$ measured by multiple sensors $a_1$ to $a_3$), and outputs the reservoir feature;

learns, in the learning period, the weight parameter so that the prediction result data obtained by performing calculations on the reservoir feature output from the reservoir feature generating unit under the weight parameter correlates with the time-series sensor data b measured by the sensor b;

performs calculations on, in the prediction period, the reservoir feature output from the reservoir feature generating unit under the learned weight parameter in response to multiple time-series sensor data $a_1$ to $a_3$ acquired in the substrate manufacturing process being input, and outputs the prediction result data; and compares the prediction result data with the time-series sensor data b acquired in the substrate manufacturing process to determine the state of the substrate manufacturing process.

With this, according to the fifth embodiment, in the substrate processing apparatus that determines the state of the substrate manufacturing process by using multiple time-series sensor data, the same effects as those of the first embodiment can be obtained.

Sixth Embodiment

In each of the embodiments described above, the case where the time-series sensor data b measured by the sensor b 140 is predicted based on the time-series sensor data measured by the sensor a 120 (or the sensor $a_1$120_1 to the sensor $a_3$120_3) has been described.

With respect to the above, in a sixth embodiment, the time-series sensor data measured by the sensor a 120 is predicted based on the time-series sensor data measured by the sensor a 120. In the following, the sixth embodiment will be described focusing on a difference from the embodiments described above.

<System Configuration of Substrate Processing Apparatus>

Figure 14:
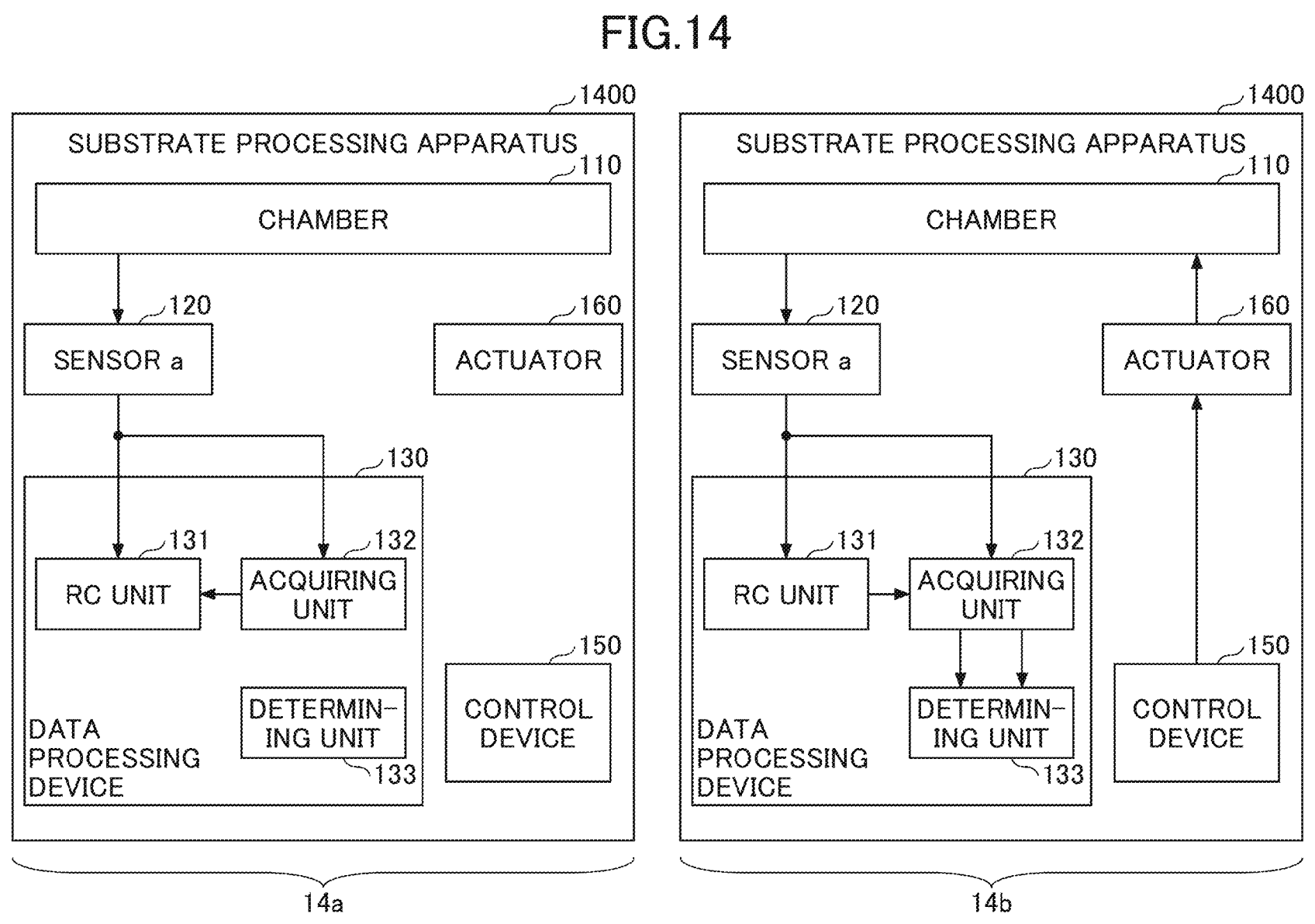

First, a system configuration of a substrate processing apparatus according to the sixth embodiment will be described. FIG. 14 is a third diagram illustrating an example of the system configuration of the substrate processing apparatus. The difference from the system configuration described with reference to FIG. 1 in the first embodiment described above is that the sensor b 140 is not included in FIG. 14.

Here, as in FIG. 1, 14$a$ of FIG. 14 illustrates data flows in a substrate processing apparatus 1400 in the learning period, and 14$b$ of FIG. 14 illustrates data flows in the substrate processing apparatus 1400 in the prediction period.

As illustrated in 14$a$ and 14$b$ of FIG. 14, the time-series sensor data measured by the sensor a 120 during the processing of the substrate in the chamber 110 is transmitted to the RC unit 131 and the acquiring unit 132. That is, the time-series sensor data measured by the sensor a 120 is an example of the first time-series sensor data acquired in the substrate manufacturing process, and is another example of the second sensor data.

The RC unit 131 realizes reservoir computing having a high expression capability and a high learning speed. Specifically, the RC unit 131 predicts the time-series sensor data measured by the sensor a 120 based on the time-series sensor data (the input data) measured by the sensor a 120.

Thus, as illustrated in 14$a$ of FIG. 14, in the learning period, the RC unit 131 acquires the time-series sensor data (the correct data) measured by the sensor a 120 via the acquiring unit 132 of the data processing device 130. Then, the RC unit 131 learns a weight parameter so that the prediction result obtained by performing calculations on the time-series sensor data (the input data) measured by the sensor a 120 under the weight parameter correlates with the correct data.

With respect to the above, as illustrated in 14$b$ of FIG. 14, in the prediction period, the RC unit 131 performs calculations on the time-series sensor data (the input data) measured by the sensor a 120 under the learned weight parameter. With this, the RC unit 131 outputs the time-series sensor data (the prediction result data). Here, the time-series sensor data (the prediction result data) output by the RC unit 131 is notified to the acquiring unit 132 of the data processing device 130.

Additionally, as illustrated in the 14$b$ of FIG. 14, in the prediction period, the acquiring unit 132 notifies the determining unit 133 of:

the time-series sensor data (the prediction result data) output by the RC unit 131; and the time-series sensor data a (the comparison data) measured by the sensor a 120.

Here, the time-series sensor data a measured by the sensor a 120 and transmitted to the acquiring unit 132 of the data processing device 130 is referred to as the "correct data" in the learning period and is referred to as the "comparison data" in the prediction period.

SUMMARY

As is apparent from the above description, the substrate processing apparatus 100 according to the sixth embodiment:

includes the reservoir feature generating unit, receives the time-series sensor data a acquired in the substrate manufacturing process (the time-series sensor data a measured by the sensor a), and outputs the reservoir feature;

learns, in the learning period, the weight parameter so that the prediction result data obtained by performing calculations on the reservoir feature output from the reservoir feature generating unit under the weight parameter correlates with the time-series sensor data a measured by the sensor a.

performs calculations on, in the prediction period, the reservoir feature output from the reservoir feature generating unit under the learned weight parameter in response to the time-series sensor data a acquired in the substrate manufacturing process being input, and outputs the prediction result data; and compares the prediction result data with the time-series sensor data a acquired in the substrate manufacturing process to determine the state of the substrate manufacturing process.

With this, according to the substrate processing apparatus 100 of the sixth embodiment, the same effects as those of the first embodiment can be obtained.

OTHER EMBODIMENTS

In each of the embodiments described above, the description assumes that the function of receiving the time-series sensor data acquired in the substrate manufacturing process and outputting the reservoir feature is realized by the reservoir feature generating unit.

However, the function of receiving the time-series sensor data acquired in the substrate manufacturing process and outputting the reservoir feature may be realized by, for example, the reservoir feature generator 205.

Thus, in the present specification, the reservoir feature generating unit includes both a function realized by the processor 201 executing the data processing program and a function realized by the reservoir feature generator 205 being executed.

Additionally, in each of the embodiments described above, the description assumes that the reservoir feature generator 205 is realized by an FPGA board or the like. However, when the reservoir feature generator is realized by the FPGA board or the like, the reservoir feature generator may be configured to include a specific physical reservoir.

In each of the embodiments described above, the case where the time-series sensor data measured by another sensor (or the time-series sensor data all measured by the same sensor) is predicted based on the time-series sensor data measured by one or more sensors has been described. Additionally, in each of the embodiments described above, the case where the state of the substrate manufacturing process is determined based on the difference data between the prediction result data and the comparison data has been described. However, a determination method of determining the state of the substrate manufacturing process is not limited thereto. For example, the determination method may be configured to directly predict the state of the substrate manufacturing process based on the time-series sensor data measured by one or multiple sensors. In this case, data indicating the state of the substrate manufacturing process is input to the learning unit as the correct data.

Additionally, in each of the embodiments described above, a learning method performed when the learning unit learns the weight parameter is not mentioned, but the learning method performed when the learning unit learns the weight parameter is suitably selected. For example, the learning unit may perform learning by a learning method such as a recursive least square method, a recursive least square method (RLS), or the like. Alternatively, the learning unit may perform learning by a learning method using Bayesian linear regression, a Kalman filter, an information filter, a particle filter, or the like.

Additionally, in the second to fourth embodiments described above, the case where multiple reservoir feature generating units 300_1 to 300_L are used has been described, but the multiple reservoir feature generating units may have the same configuration or different configurations.

Additionally, in the fifth embodiment described above, the case where the time-series sensor data b measured by one sensor b 140 is predicted based on the time-series sensor data $a_1$ to $a_3$ measured by three sensors $a_1$120_1 to $a_3$120_3. However, the number of the sensor data used for the prediction is not limited to three, and may be, for example, n pieces of sensor data measured by n (n is a suitable integer of 2 or more) sensors belonging to the first sensor. Additionally, the number of the time-series sensor data to be predicted is not limited to one, and may be, for example, m pieces of sensor data measured by m (m is a suitable integer of 1 or more) sensors belonging to the second sensor.

Here, the present invention is not limited to the configurations described herein, such as the configurations described in the above embodiments, combinations of the configurations described in the above embodiments with other elements, and the like. These points can be changed within a range not departing from the gist of the present invention, and can be appropriately determined according to the application form.

This application is based upon and claims the priority to Japanese Patent Application No. 2021-101004 filed on Jun. 17, 2021, the entire contents of which are incorporated herein by reference.

DESCRIPTION OF REFERENCE SYMBOLS

100: substrate processing apparatus
110: chamber
120: sensor a
130: data processing device
131: RC unit
132: acquiring unit
133: determining unit
140: sensor b
150: control device
160: actuator
205: reservoir feature generator
300: reservoir feature generating unit
310: predicting unit
311: weight acquiring unit

312: calculating unit
320: period determining unit
330: switching unit
340: learning unit
341: weight calculating unit
501: sensor data acquiring unit
503: prediction result data acquiring unit
511: difference calculating unit
512: state determining unit
900: RC unit
300_1 to 300_L: reservoir feature generating unit
1000: data processing device
1010_1 to 1010_L: RC unit
1020: switching unit
1021: switching unit
1100: data processing device
1110_1 to 1110_L: RC unit
1120: predicting unit
1130: integrating unit
1140: predicting unit
1141: weight acquiring unit
1142: calculating unit
1150: period determining unit
1160: switching unit
1170: learning unit
1171: weight calculating unit
1200: substrate processing apparatus
1210: RC unit
1400: substrate processing apparatus

The invention claimed is:

1. A substrate processing apparatus comprising:
circuitry configured to:
receive first time-series sensor data acquired in a substrate manufacturing process and output a reservoir feature;
learn, in a learning period, a weight parameter so that prediction result data obtained by performing calculations on the output reservoir feature under the weight parameter correlates with second time-series sensor data acquired in the substrate manufacturing process;
perform calculations, in a prediction period, on the output reservoir feature in response to the first time-series sensor data acquired in the substrate manufacturing process being input, under the learned weight parameter learned, to output prediction result data; and
determine, in the prediction period, a state of the substrate manufacturing process by comparing the prediction result data with second time-series sensor data acquired in the substrate manufacturing process.

2. The substrate processing apparatus as claimed in claim 1, comprising
a memory storing program instructions,
wherein the circuitry includes a processor and a plurality of reservoir feature generators, the program instructions causing the processor to perform the learning, the calculations, and the determining, and the plurality of reservoir feature generators being configured to receive the first time-series sensor data acquired in the substrate manufacturing process in parallel and output respective reservoir features,
wherein the program instructions cause the processor to learn weight parameters so that prediction result data obtained by performing weighted addition on the reservoir features respectively output from the plurality of reservoir feature generators by using the weight parameters correlates with the second time-series sensor data acquired in the substrate manufacturing process, and wherein the program instructions causing the processor to perform weighted addition on reservoir features respectively output from the plurality of reservoir feature generators in response to the first time-series sensor data acquired in the substrate manufacturing process being input in parallel, by using the learned weight parameters, to output prediction result data.

3. The substrate processing apparatus as claimed in claim 1, comprising a memory storing program instructions,
wherein the circuitry includes a processor and a plurality of reservoir feature generators, the program instructions causing the processor to perform the learning, the calculations, and the determining, the plurality of reservoir feature generators being connected in series, and the plurality of reservoir feature generators including a reservoir feature generator at a starting end, into which the first time-series sensor data acquired in the substrate manufacturing process is input, and a reservoir feature generator subsequent to the starting end, into which prediction result data obtained by performing calculations on a reservoir feature output by an immediately preceding reservoir feature generator under a weight parameter is input,
wherein in the learning period, the program instructions causing the processor to learn weight parameters respectively corresponding to the plurality of reservoir feature generators so that respective prediction result data obtained by performing calculations on the reservoir features respectively output from the plurality of reservoir feature generators under the weight parameters correlate with the second time-series sensor data acquired in the substrate manufacturing process,
wherein in the prediction period, the program instructions causing the processor to perform calculations on the reservoir features respectively output from the plurality of reservoir feature generators, under the learned weight parameters, to output respective prediction result data, and
wherein in the prediction period, the program instructions causing the processor to determine the state of the substrate manufacturing process by comparing final prediction result data corresponding to a reservoir feature generator at a terminal end with the second time-series sensor data acquired in the substrate manufacturing process.

4. The substrate processing apparatus as claimed in claim 1, comprising:
a memory storing program instructions,
wherein the circuitry includes a processor and a plurality of reservoir feature generators, the program instructions causing the processor to perform the learning, the calculations, and the determining,
wherein the plurality of reservoir feature generators are configured to receive the first time-series sensor data acquired in the substrate manufacturing process in parallel and output respective reservoir features,
wherein the program instructions causing the processor to learn, in the learning period, corresponding weight parameters so that respective prediction result data obtained by performing calculations on the reservoir features respectively output from the plurality of reservoir feature generators under the corresponding weight parameters correlate with the second time-series sensor data acquired in the substrate manufacturing process,
wherein the program instructions causing the processor to perform calculations on the reservoir features respectively output from the plurality of reservoir feature generators under the learned weight parameters and output respective prediction result data, wherein the program instructions causing the processor to learn, in the learning period, a weight parameter used for weighted addition so that final prediction result data obtained by performing the weighted addition on the output respective prediction result data by using the weight parameter correlates with the second time-series sensor data acquired in the substrate manufacturing process, wherein the program instructions causing the processor to perform the weighted addition, in the prediction period, on the output respective prediction result data by using the weight parameter learned by the processor, to output final prediction result data, and wherein in the learning period and the prediction period, the output respective prediction result data are prediction result data obtained by correcting, by using the final prediction result data, the prediction result data obtained by performing calculations on the reservoir features respectively output from the plurality of reservoir feature generators under the corresponding weight parameters.

5. The substrate processing apparatus as claimed in claim 1, wherein the circuitry is configured to receive a plurality of first time-series sensor data acquired in the substrate manufacturing process and output a reservoir feature, wherein the circuitry is configured to learn a weight parameter so that prediction result data obtained by performing calculations on the output reservoir feature under the weight parameter correlates with the second time-series sensor data acquired in the substrate manufacturing process, and wherein the circuitry is configured to perform calculations on the output reservoir feature in response to the plurality of first time-series sensor data being input, under the learned weight parameter, to output prediction result data.

6. The substrate processing apparatus as claimed in claim 1, wherein the first time-series sensor data acquired in the substrate manufacturing process and input into the circuitry is time-series sensor data measured by a first sensor, and wherein the second time-series sensor data acquired in the substrate manufacturing process and used for the learning is time-series sensor data measured by a second sensor different from the first sensor.

7. The substrate processing apparatus as claimed in claim 6, wherein the plurality of first time-series sensor data acquired in the substrate manufacturing process are n pieces of time-series sensor data measured by n (n is an integer of 2 or more) sensors belonging to the first sensor, and wherein the second time-series sensor data acquired in the substrate manufacturing process and used for the learning are m pieces of time-series sensor data measured by m (m is an integer of 1 or more) sensors belonging to the second sensor different from the first sensor.

8. The substrate processing apparatus as claimed in claim 1, wherein the first time-series sensor data acquired in the substrate manufacturing process is time-series sensor data measured by a first sensor, and wherein the second time-series sensor data acquired in the substrate manufacturing process and used for the learning is time-series sensor data measured by the first sensor.

9. The substrate processing apparatus of claim 6, wherein the circuitry is further configured to:

calculate a difference between the second time-series sensor data measured by the second sensor and the output prediction result data; and determine the state of the substrate manufacturing process based on the calculated difference data.

10. The substrate processing apparatus of claim 8, wherein the circuitry is further configured to:

calculate a difference between the first time-series sensor data measured by the first sensor and the output prediction result data; and determine the state of the substrate manufacturing process based on the calculated difference data.

11. The substrate processing apparatus as claimed in claim 9, wherein the circuitry determines the state of the substrate manufacturing process by determining whether the difference data exceeds a predetermined threshold value or by determining whether the difference data in a predetermined time range is similar to a predetermined pattern.

12. The substrate processing apparatus as claimed in claim 11, wherein an actuator is controlled in accordance with a result of determining the state of the substrate manufacturing process.

13. A data processing method in a substrate processing apparatus, comprising:

receiving first time-series sensor data acquired in a substrate manufacturing process and outputting a reservoir feature;

learning, in a learning period, a weight parameter so that prediction result data obtained by performing calculations on the output reservoir feature based on the weight parameter correlates with second time-series sensor data acquired in the substrate manufacturing process;

performing calculations, in a prediction period, on the output reservoir feature in response to the first time-series sensor data acquired in the substrate manufacturing process being input, under the learned weight parameter, to output prediction result data; and determining, in the prediction period, a state of the substrate manufacturing process by comparing the prediction result data with second time-series sensor data acquired in the substrate manufacturing process.

14. A non-transitory computer-readable recording medium having stored therein a data processing program causing a computer in a substrate processing apparatus to execute steps comprising:

receiving first time-series sensor data acquired in a substrate manufacturing process and outputting a reservoir feature;

learning, in a learning period, a weight parameter so that prediction result data obtained by performing calculations on the output reservoir feature based on the weight parameter correlates with second time-series sensor data acquired in the substrate manufacturing process;

performing calculations, in a prediction period, on the output reservoir feature in response to the first time-series sensor data acquired in the substrate manufacturing process being input, under the learned weight parameter, to output prediction result data; and determining, in the prediction period, a state of the substrate manufacturing process by comparing the prediction result data with second time-series sensor data acquired in the substrate manufacturing process.

15. The substrate processing apparatus as claimed in claim 1, comprising a memory storing program instructions, wherein the circuitry includes a processor, the program instructions causing the processor to perform the receiving and outputting, the learning, the calculations, and the determining.

\* \* \* \* \*